(12) United States Patent
Cohen et al.

(10) Patent No.: US 11,303,452 B2
(45) Date of Patent: Apr. 12, 2022

(54) BIOMETRIC DIGITAL SIGNATURE GENERATION FOR IDENTITY VERIFICATION

(71) Applicant: Keychainx LLC, Beverly Hills, CA (US)

(72) Inventors: Joel Cohen, Beverly Hills, CA (US); Bartlomiej Robert Rhodin, Stockholm (SE)

(73) Assignee: KeychainX AG, Zug (CH)

( * ) Notice: Subject to any disclaimer, the term of this patent is extended or adjusted under 35 U.S.C. 154(b) by 240 days.

(21) Appl. No.: 16/374,517

(22) Filed: Apr. 3, 2019

(65) Prior Publication Data

US 2020/0322155 A1    Oct. 8, 2020

(51) Int. Cl.
*H04L 9/32*    (2006.01)

(52) U.S. Cl.
CPC .......... *H04L 9/3231* (2013.01); *H04L 9/3239* (2013.01); *H04L 9/3247* (2013.01)

(58) Field of Classification Search
CPC ..... G06F 21/32; H04L 9/3231; H04L 9/3239; H04L 9/3247
USPC .......................................................... 713/186
See application file for complete search history.

(56) References Cited

U.S. PATENT DOCUMENTS

| | | | | |
|---|---|---|---|---|
| 6,310,966 B1* | 10/2001 | Dulude | ................. | H04L 9/3231 |
| | | | | 382/115 |
| 6,925,182 B1* | 8/2005 | Epstein | ................. | H04L 9/0866 |
| | | | | 380/277 |
| 7,971,063 B2* | 6/2011 | Guenther | ............. | H04L 9/3247 |
| | | | | 713/176 |
| 9,197,637 B2* | 11/2015 | Sy | .......................... | H04L 9/008 |
| 9,736,151 B2* | 8/2017 | Ikeda | ................. | H04L 63/0823 |
| 10,142,333 B1* | 11/2018 | Griffin | ............... | H04L 63/0861 |
| 10,547,453 B2* | 1/2020 | Csik | .................... | G06F 21/6272 |
| 2009/0313171 A1* | 12/2009 | Yacobi | ................. | H04L 9/3247 |
| | | | | 705/51 |
| 2015/0113283 A1* | 4/2015 | Corella | .................. | G06F 21/32 |
| | | | | 713/185 |
| 2017/0085562 A1 | 3/2017 | Schultz et al. | | |

(Continued)

OTHER PUBLICATIONS

PCT/US2019/051358; International Search Report and Written Opinion, dated Dec. 4, 2019; 13 pages.

*Primary Examiner* — Amare F Tabor
(74) *Attorney, Agent, or Firm* — Haynes and Boone, LLP

(57) ABSTRACT

Systems, methods, and apparatus for biometric digital signature generation for identity verification are disclosed. In one or more embodiments, a method for identity verification of a user comprises sensing, by at least one sensor, biometric information from the user. The method further comprises generating, by a sensor device, biometric data from the biometric information. Also, the method comprises hashing, by the user device utilizing a fuzzy hash algorithm or a hash algorithm (i.e. a non-fuzzy hash algorithm), at least a portion of the biometric data to generate a biometric digital signature for the user. In addition, the method comprises comparing, by a verification node, the biometric digital signature to a previous biometric digital signature for the user. Further, the method comprises verifying, by the verification node, the user when the verification node determines that the biometric digital signature is identical to the previous biometric digital signature for the user.

20 Claims, 18 Drawing Sheets

(56) References Cited

U.S. PATENT DOCUMENTS

| | | |
|---|---|---|
| 2018/0268414 A1 | 9/2018 | Chung et al. |
| 2019/0066063 A1 | 2/2019 | Jessamine |
| 2020/0177584 A1* | 6/2020 | Wajs ........................ G06F 21/32 |

* cited by examiner

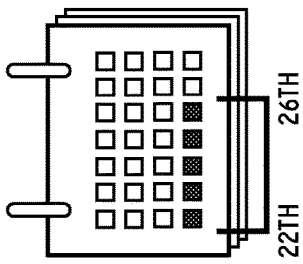
CALENDAR DATE RANGE
1630
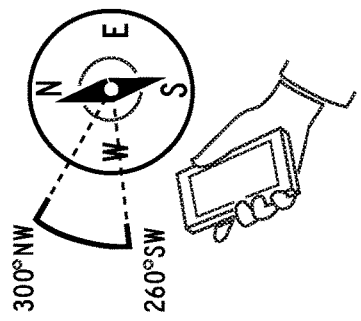
CARDINAL DIRECTION RANGE
1660
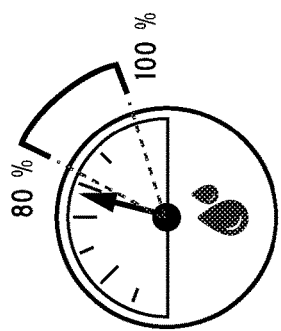
HUMIDITY RANGE
1620
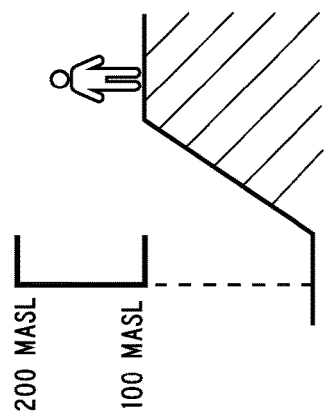
ELEVATION RANGE
1650
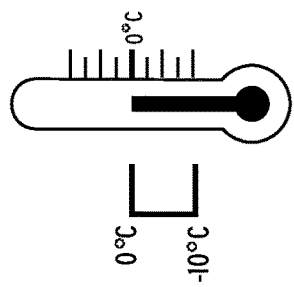
TEMPERATURE RANGE
1610
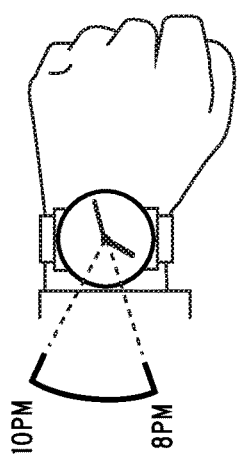
TIME RANGE
1640
FIG. 16   1600

BIOMETRIC DIGITAL SIGNATURE GENERATION FOR IDENTITY VERIFICATION

FIELD

The present disclosure relates to identify verification. In particular, the present disclosure relates to biometric digital signature generation for identity verification and settlements verification for distributed ledgers.

BACKGROUND

Distributed ledgers, such as blockchain, provide a unique system for recording transactions. In general, distributed ledgers store a log of transactions that may be replicated across a distributed network. Cryptography and digital signatures are often used to determine valid parties and transactions such that all parties agree on the state of the ledger in real-time without having to rely on a trusted third party. In some instances, however, a user may lose their digital signature for the distributed ledger. It can be a burdensome and lengthy process for the user to obtain another valid digital signature.

In light of the foregoing, there is a need for an improved system and method for generating a valid digital signature for a user.

SUMMARY

The present disclosure relates to a method, system, and apparatus for biometric digital signature generation for identity verification. In one or more embodiments, a method for identity verification of a user comprises sensing, by at least one sensor, biometric information from the user. The method further comprises generating, by a sensor device, biometric data from the biometric information. Also, the method comprises transmitting, by the sensor device, the biometric data to a user device. Additionally, the method comprises hashing, by the user device, at least a portion of the biometric data to generate a biometric digital signature for the user. In addition, the method comprises transmitting, by the user device, the biometric digital signature to a verification node. Also, the method comprises comparing, by the verification node, the biometric digital signature to a previous biometric digital signature for the user. Further, the method comprises verifying, by the verification node, the user when the verification node determines that the biometric digital signature is identical to the previous biometric digital signature for the user.

In one or more embodiments, the method further comprises, when the user is verified, generating and transmitting, by the verification node to the user device, a confirmation verification signal indicating that the user is verified. In at least one embodiment, the method further comprises not verifying, by the verification node, the user when the verification node determines that the biometric digital signature is not identical to the previous biometric digital signature for the user. In some embodiments, method further comprises, when the user is not verified, generating and transmitting, by the verification node to the user device, an abort verification signal indicating that the user is not verified. In one or more embodiments, the verification node determines that the biometric digital signature is identical to the previous biometric digital signature for the user, when the verification node determines that the biometric digital signature is one-hundred (100) percent the same as (i.e. identical to) the previous biometric digital signature for the user.

In at least one embodiment, when the user is verified, the method further comprises allowing the user to transfer assignment of a data block from the user to a beneficiary; allowing the user to transfer ownership of property from the user to the beneficiary; allowing the user to obtain medical records for the user; allowing the user to vote on behalf of the user; allowing the user to obtain travel documentation for the user; and/or allowing the user to make banking transactions on behalf of the user.

In one or more embodiments, the biometric information comprises at least three fingerprints, at least a portion of a deoxyribonucleic acid (DNA) sequence, at least a portion of at least one facial feature, isotopic information from odor, at least a portion of an eye feature, audio information from a voice, a three-dimensional (3D) surface scan of at least a portion of the user, and/or a two-dimensional (2D) surface scan of at least the portion of the user.

In at least one embodiment, the user device utilizes a hash algorithm or a fuzzy hash algorithm to hash at least a portion of the biometric data. In one or more embodiments, the user device utilizes an elliptical curve digital signature algorithm (ECDSA) to hash at least a portion of the biometric data. In some embodiments, the user device utilizes a SHA-256 algorithm, a Merkle-Damgard algorithm, a MD5 algorithm, a SHA-1 algorithm, a SHA-2 algorithm, a RACE Integrity Primitives Evaluation Message Digest-160 (RIPEMD-160) algorithm, a Whirlpool algorithm, or a BLAKE2 algorithm to hash at least a portion of the biometric data.

In one or more embodiments, the biometric digital signature is generated by additionally hashing, by the user device, additional identifying information. In some embodiments, the additional identifying information comprises location information, temperature information, humidity information, date information, time information, elevation information, range information, and/or personal information.

In at least one embodiment, the biometric digital signature is a private identity key for the user. In one or more embodiments, the user device is a smart phone, a tablet device, a personal computer, a laptop computer, a smart watch, a smart television (TV), a car, or a computing device. In some embodiments, the user device comprises at least one sensor, the sensor device, and/or the verification node.

In one or more embodiments, a method for identity verification of at least one user comprises sensing, by at least one sensor, biometric information from the user. The method further comprises generating, by a sensor device, biometric data from the biometric information. Also, the method comprises transmitting, by the sensor device, the biometric data to a user device. In addition, the method comprises hashing, by a user device, at least a portion of the biometric data to generate a biometric digital signature for the user. Additionally, the method comprises storing, by the user device, at least a portion of the biometric digital signature for the user to a host biometric digital signature held by each of at least n (e.g., six (6)) number of persons to generate the host biometric digital signature for each of the n number of persons, such that a combination of the host biometric digital signatures for at least m (e.g., four (4)) number of the n number of persons comprises all of the biometric digital signature for the user, where the m number is a number greater than half of the n number. Also, the method comprises generating, by the user device, a reconstructed biometric digital signature for the user by using the hosted biometric digital signatures for at least m number of the n number of persons. In addition, the method comprises transmitting, by the user device, the reconstructed biometric digital signature to a verification node. Also, the method comprises comparing, by the verification node, the reconstructed biometric digital signature to a previous biometric digital signature for the user. Further, the method comprises verifying, by the verification node, the user when the verification node determines that the reconstructed biometric digital signature is identical to the previous biometric digital signature for the user.

In at least one embodiment, a system for identity verification of a user comprises at least one sensor to sense biometric information from the user. The system further comprises a sensor device to generate biometric data from the biometric information, and to transmit the biometric data to a user device. Also, the system comprises the user device to hash at least a portion of the biometric data to generate a biometric digital signature for the user, and to transmit the biometric digital signature to a verification node. Further, the system comprises the verification node to compare the biometric digital signature to a previous biometric digital signature for the user, and to verify the user when the verification node determines that the biometric digital signature is identical to the previous biometric digital signature for the user.

In one or more embodiments, when the user is verified, the verification node is further to generate and to transmit to the user device, a confirmation verification signal indicating that the user is verified. In at least one embodiment, the verification node is to not verify the user when the verification node determines that the biometric digital signature is not identical to the previous biometric digital signature for the user. In some embodiments, when the user is not verified, the verification node is further to generate and to transmit to the user device, an abort verification signal indicating that the user is not verified. In one or more embodiments, the user device comprises at least one sensor and the sensor device.

In at least one embodiment, the user device is to utilize a hash algorithm or a fuzzy hash algorithm to hash at least a portion of the biometric data to generate the biometric digital signature for the user. In one or more embodiments, the user device is to utilize an elliptical curve digital signature algorithm (ECDSA) to hash at least a portion of the biometric data. In some embodiments, the user device utilizes a SHA-256 algorithm, a Merkle-Damgard algorithm, a MD5 algorithm, a SHA-1 algorithm, a SHA-2 algorithm, a RACE Integrity Primitives Evaluation Message Digest-160 (RIPEMD-160) algorithm, a Whirlpool algorithm, or a BLAKE2 algorithm to hash at least a portion of the biometric data.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 16 is a diagram illustrating various different types of additional identifying information that may be hashed along with biometric data obtained from the user to generate a biometric digital signature for the user, in accordance with at least one embodiment of the present disclosure.

DESCRIPTION

Figure 1A:
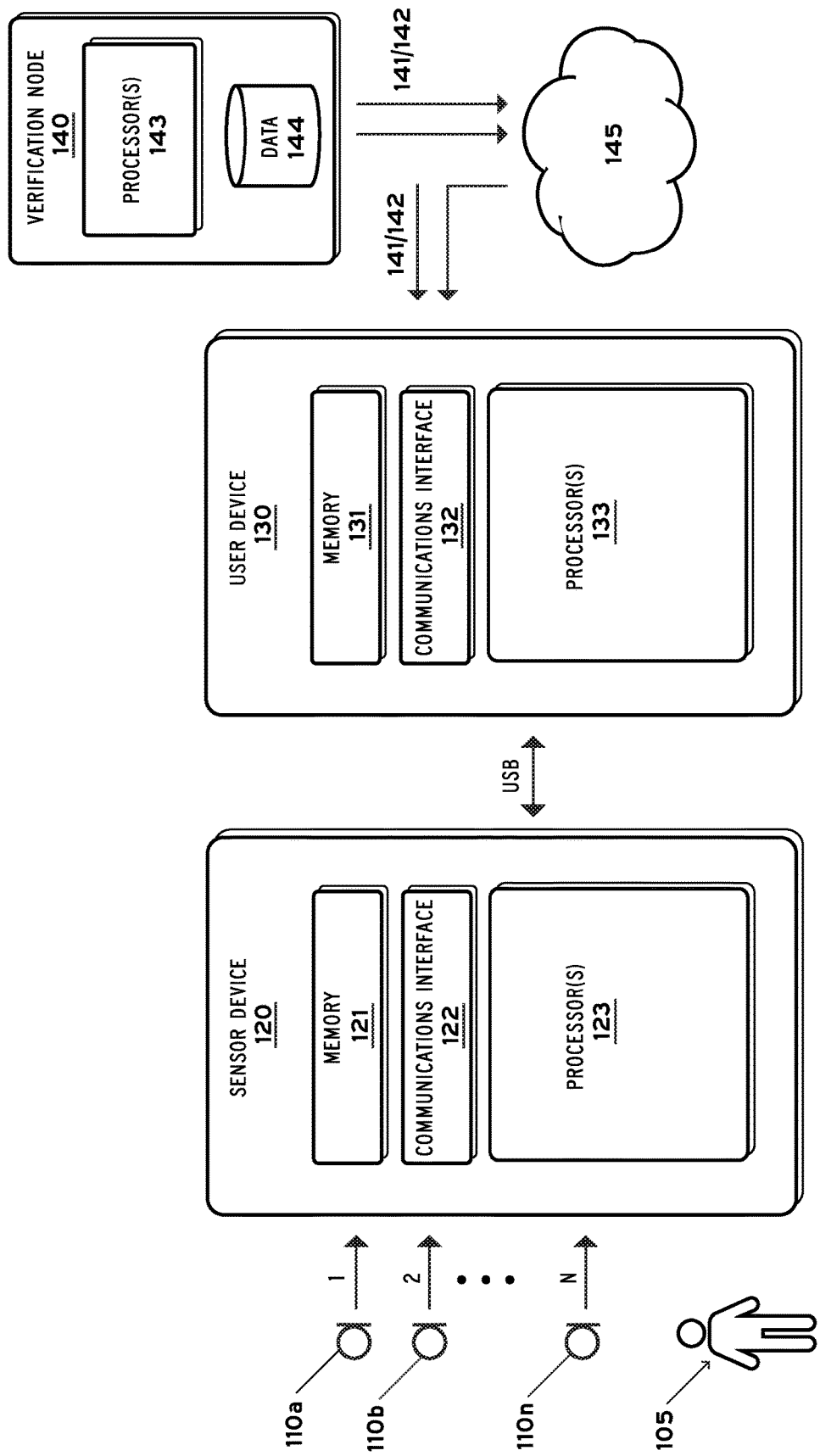
FIG. 1A is a diagram showing the disclosed system for biometric digital signature generation for identity verification of a user, in accordance with at least one embodiment of the present disclosure.

The methods and apparatus disclosed herein provide an operative system for biometric digital signature generation for identity verification. In one or more embodiments, the system provides biometric digital signature generation, identity verification, and settlements verification for distributed ledgers. In particular, the system of the present disclosure generates a biometric digital signature for a user by hashing with a fuzzy hash algorithm (or alternatively a hash algorithm (e.g., a non-fuzzy hash algorithm)) biometric data from the user, where the biometric digital signature may be used for identity verification of the user that can be utilized for settlements verification for distributed ledgers. It should be noted that, a cryptographic hash function has certain properties, which make it suitable for use in cryptography. A hash algorithm (i.e. a non-fuzzy hash algorithm) maps data of an arbitrary size to a bit string of a fixed size (i.e. a hash). Conversely, a fuzzy hash algorithm maps data of an arbitrary size to a bit string of a non-fixed size (i.e. a hash).

The system of the present disclosure solves the problem in digital signature creation where the source (i.e. user) able to create and protect their digital signature originating from their own biometric data. In one or more embodiments, the system of the present disclosure employs the use of a fuzzy hash algorithm (or alternatively a hash algorithm (i.e. a non-fuzzy hash algorithm)) to create the digital signature from the biometric data. Using a fuzzy hash algorithm (conversely to a hash algorithm (i.e. a non-fuzzy hash algorithm)), the obtained biometric data from the source does not need to be one-hundred (100) percent accurate, as the fuzzy hash creates a digital signature without requiring 100 percent of the biometric data to be accurate.

Fuzzy hash digital signature generation improves privacy and security when multiple transactions are required from the biometric source on a public ledger by allowing the generation of new digital signatures and comparing them to the original digital signature that is stored on the distributed ledgers.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to identity verification, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1A is a diagram showing the disclosed system 100 for biometric digital signature generation for identity verification of a user 105, in accordance with at least one embodiment of the present disclosure. In this figure, sensors 110a-110n are shown to be communicatively connected (via wire and/or wirelessly) to a sensor device 120. The sensor device 120 comprises a processor(s) 123, a communications interface 122, and memory 121. It should be noted that in other embodiments, the sensor device 120 may comprise more or less number of components than as shown in FIG. 1A. In one or more embodiments, the sensors 110a-110n may comprise various different types of sensors including, but not limited to, image scanning devices, chemical detection devices, temperature sensors, humidity sensors, elevation sensors, direction sensors, and/or Global Position System (GPS) signal receivers. In addition, in some embodiments, there may be more or less number of sensors 110a-110n as is shown in FIG. 1A.

Also, in FIG. 1A, a user device 130 is shown to comprise a processor(s) 133, a communications interface 132, and memory 131. Similar to the sensor device 120, in other embodiments, the user device 130 may comprise more or less number of components than as shown in FIG. 1A. The sensor device 120 is communicatively connected (via wire (e.g., universal serial bus (USB)) and/or wirelessly) to the user device 130. In one or more embodiments, the user device 130 is a computing device associated with the user 105. Various different types of computing devices may be employed for the user device 130 of the disclosed system 100 including, but not limited to, a smart phone, a tablet device, a personal computer, a laptop computer, a smart watch, a smart television (TV), a car, or a computing device (e.g., any computing device that is capable of running an operating system, such as Android, OSX, Windows, Unix, or future operating systems).

The user device 130 is communicatively connected (via wire and/or wirelessly), for example over the internet 145 (and/or other public and/or private network(s) and/or intranet(s)), to a node (e.g., a verification node) 140. The node 140 is shown to comprise a processor(s) 143 and a database 144. In other embodiments, the node 140 may comprise more or less number of components than as shown in FIG. 1A. In one or more embodiments, the node 140 is a computing device, such as a server. It should be noted that, in one or more embodiments, various different types of computing devices may be employed for the node 140. In some embodiments, the user device 130 may comprise at least one of the sensors 110a-110n, the sensor device 120, and/or the node (e.g., verification node) 140.

During operation of the disclosed system 100, at least one sensor 110a-110n senses biometric information from the user 105. Various different types of biometric information may be sensed from the user 105 including, but not limited to, fingerprint information, information from a blood sample (e.g., a deoxyribonucleic acid (DNA) sequence), facial feature information, isotopic information from odor, eye feature information, audio information from voice, a three-dimensional (3D) surface scan of at least a portion of the user 105, and/or a two-dimensional (2D) surface scan of at least the portion of the user 105.

After at least one sensor 110a-110n has sensed biometric information from the user 105, at least one sensor 110a-110n transmits (via wire and/or wirelessly) the biometric information to the sensor device 120. After the sensor device 120 receives the biometric information of the user 105, at least one processor 123 converts the biometric information (e.g., in an analog data format) to biometric data (e.g., in a digital data format, such as a binary number and/or hexadecimal number). In one or more embodiments, the sensor device 120 may store the biometric data in memory 121. After the sensor device 120 as converted the biometric information into biometric data, a communications interface 122 (e.g., which may contain a transmitter and/or receiver) of the sensor device 120 transmits (via wire and/or wirelessly) (e.g., via USB) the biometric data for the user 105 to the user device 130.

After the communications interface 133 (e.g., which may contain a transmitter and/or receiver) of the user device 130 receives the biometric data for the user 105, at least one processor 133 of the user device 130 utilizes a fuzzy hash algorithm (or alternatively a hash algorithm) to hash at least a portion of the biometric data to generate a biometric digital signature for the user 105. In one or more embodiments, the user device 130 utilizes an elliptical curve digital signature algorithm (ECDSA) to hash at least a portion of the biometric data to generate a biometric digital signature for the user 105. It should be noted that various different types algorithms (e.g., hash algorithms and fuzzy hash algorithms) may be employed by the user device 130 of the disclosed system 100 to hash including, but not limited to, a SHA-256 algorithm, a Merkle-Damgard algorithm, a MD5 algorithm, a SHA-1 algorithm, a SHA-2 algorithm, a RACE Integrity Primitives Evaluation Message Digest-160 (RIPEMD-160) algorithm, a Whirlpool algorithm, and a BLAKE2 algorithm.

In addition, it should be noted that, in one or more embodiments, in addition to biometric data from the user, at least a portion of additional identifying information for the user 105 may be hashed (along with at least a portion of the biometric data) by at least one processor 133 utilizing a fuzzy hash algorithm or a hash algorithm to generate the biometric digital signature for the user 105. Various different types of additional identifying information for the user 105 that may be used include, but are not limited to, location information, temperature information, humidity information, date information, time information, elevation information, range information, and/or personal information (e.g., date of birth and/or at least a portion of a social security number).

In one or more embodiments, the biometric digital signature for the user 105 may be utilized as a private identity key for user 105. The user 105 may use this private identity key to be able to conduct transactions, access data, and/or participate in activities. In at least one embodiment, the user device 130 stores the biometric digital signature in memory 131.

In one or more embodiments, when a user 105 desires to conduct a transaction (e.g., make a banking transaction, transfer assignment of a data block of a blockchain from the user 105 to a beneficiary and/or allow the user 105 to transfer ownership of property from the user 105 to a beneficiary), access data (e.g., obtain medical records for the user 105 and/or obtain travel documentation for the user), and/or participate in activities (e.g., vote on behalf of the user 105); the user 105 may be verified by having the biometric digital signature validated. For the user 105 to be verified using this process, the communications interface 132 of the user device 130 first transmits (via wire and/or wirelessly), for example over the internet 145 (and/or other public and/or private network(s) and/or intranet(s)), the biometric digital signature of the user 105 to the node (e.g., a verification node) 140. At least one processor 143 of the verification node 140 compares the biometric digital signature for the user 105 to a previous biometric digital signature for the user 105. The previous biometric digital signature for the user 105 is a biometric digital signature that was previously generated and validated for the user 105 in the past.

In one or more embodiments, the database 144 comprises at least one database. In one or more embodiments, at least one of the databases of database 144 of the node 140 comprises the previous biometric digital signature for the user 105. In at least one embodiment, at least one of the databases of database 144 comprises biometric digital signatures for a plurality of different users (including the user 105). In at least one embodiment, at least one of the databases of the database 144 is a distributed ledger (e.g., which comprises a blockchain).

After at least one processor 143 has compared the biometric digital signature for the user 105 to the previous biometric digital signature for the user 105, if at least one processor 143 determines that the biometric digital signature for the user 105 is identical to the previous biometric digital signature for the user 105, at least one processor 143 then validates the biometric digital signature, which verifies the user 105. In one or more embodiments, at least one processor 143 determines that the biometric digital signature for the user 105 is identical to the previous biometric digital signature for the user 105, when at least one processor 143 determines that the biometric digital signature for the user 105 is one-hundred (100) percent the same as (i.e. identical to) the previous biometric digital signature for the user 105.

After at least one processor 143 determines that the biometric digital signature for the user 105 is identical to the previous biometric digital signature for the user 105, at least one processor 143 generates a confirmation verification signal 141, which indicates that the biometric digital signature has been validated. The node 140 then transmits (via wire and/or wirelessly), for example via the internet 145, the confirmation verification signal 141 to the communications interface 132 of the user device 130 to notify the user 105 that the biometric digital signature has been validated and, thus, that the user 105 has been verified. After the user 105 has been verified, the user 105 is able to conduct the transaction (e.g., transfer assignment of a block in a blockchain), access the data, and/or participate in the activity.

However, if at least one processor 143 determines that the biometric digital signature for the user 105 is not identical to the previous biometric digital signature for the user 105, at least one processor 143 generates an abort verification signal 142, which indicates that the biometric digital signature has not been validated. The node 140 then transmits (via wire and/or wirelessly), for example via the internet 145, the abort verification signal 142 to the communications interface 132 of the user device 130 to notify the user 105 that the biometric digital signature has not been validated and, thus, that the user 105 has not been verified. Since the user 105 has not been verified, the user 105 is unable to conduct the transaction, access the data, and/or participate in the activity. As previously mentioned above, it should be noted that in some embodiments, the user device 130 comprises the node 140.

Figure 1B:
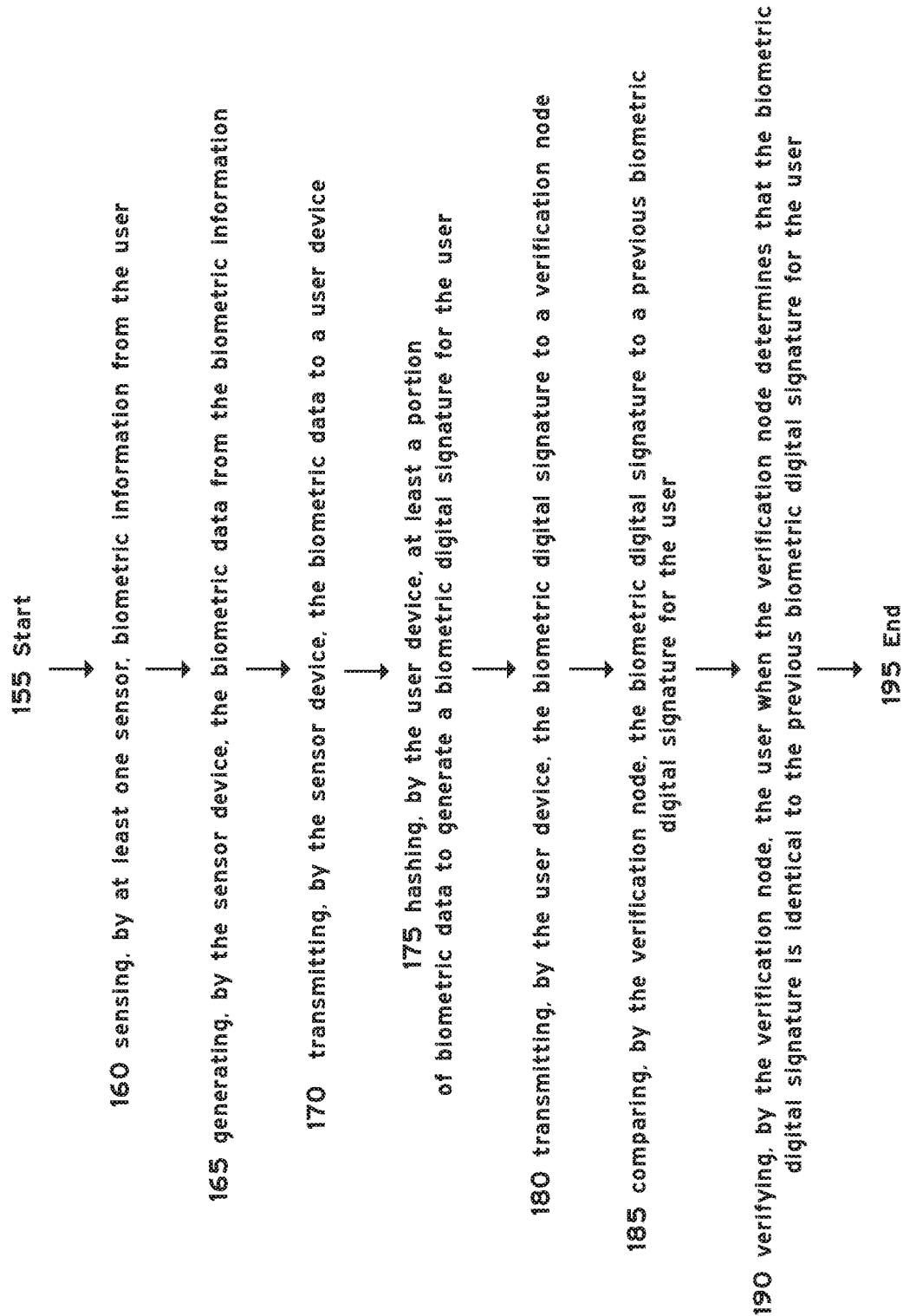
FIG. 1B is a flow chart showing the disclosed method for biometric digital signature generation for identity verification of a user, in accordance with at least one embodiment of the present disclosure.

FIG. 1B is a flow chart showing the disclosed method 150 for biometric digital signature generation for identity verification of a user, in accordance with at least one embodiment of the present disclosure. At the start 155 of the method 150, at least one sensor senses biometric information from the user 160. Then, a sensor device generates biometric data from the biometric information 165. The sensor device then transmits the biometric data to a user device 170. The user device 170 then hashes at least a portion of the biometric data to generate a biometric digital signature for the user 175. Then, the user device transmits the biometric digital signature to a verification node 180. The verification node then compares the biometric digital signature to a previous biometric digital signature for the user 185. Then, the verification node verifies the user when the verification node determines that the biometric digital signature is identical to the previous biometric digital signature for the user 190. Then, the method 150 ends 195.

Figure 2:
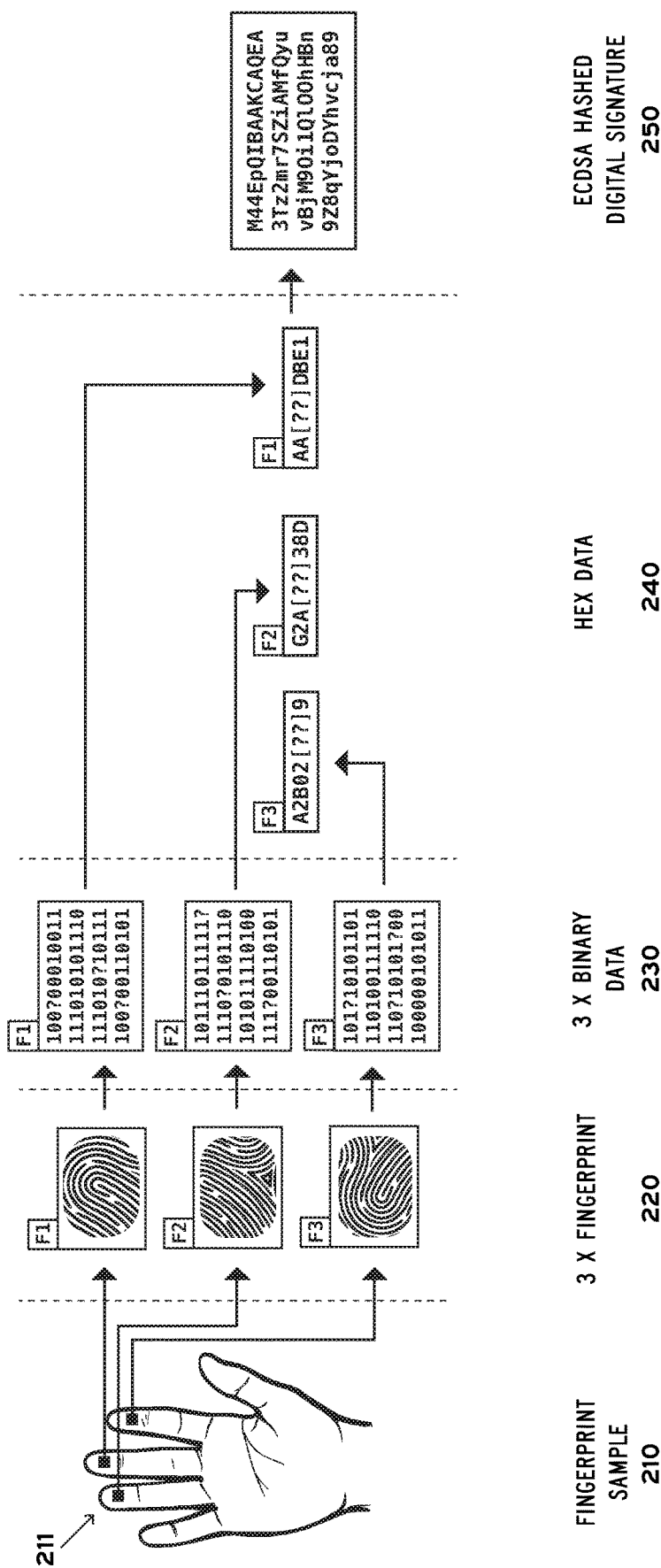
FIG. 2 is a diagram illustrating the process of hashing biometric data obtained from fingerprints of a user to generate a biometric digital signature for the user, in accordance with at least one embodiment of the present disclosure.

FIG. 2 is a diagram illustrating the process 200 of hashing biometric data 240 obtained from fingerprints 220 of a user 105 to generate a biometric digital signature 250 for the user 105, in accordance with at least one embodiment of the present disclosure. In this figure, a fingerprint sample 210 comprising images of fingerprints 220 (e.g., at least three fingerprints) (i.e. biometric information) is first obtained (e.g., sensed and/or imaged) from the fingers of the user 105. The images of the fingerprints 220 (i.e. biometric information, e.g., in an analog data format) is converted to biometric data (e.g., digital data, such as a binary number 230 and/or a hexadecimal number 240). At least a portion of the biometric data (e.g., a binary number 230 or a hexadecimal number 240) is hashed utilizing a fuzzy hash algorithm (or alternatively a hash algorithm) to generate a biometric digital signature 250 for the user 105.

Figure 3:
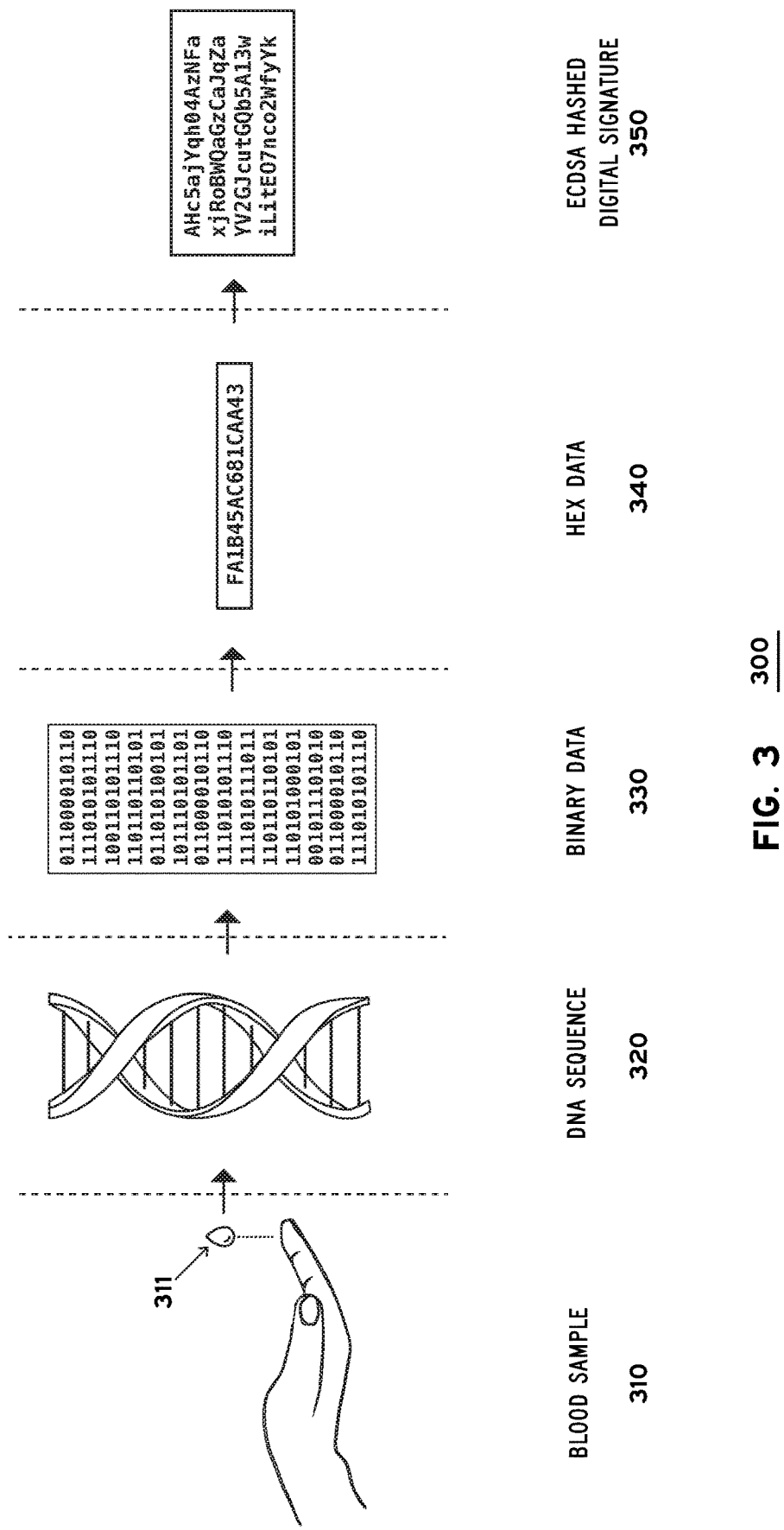
FIG. 3 is a diagram illustrating the process of hashing biometric data obtained from blood of a user to generate a biometric digital signature for the user, in accordance with at least one embodiment of the present disclosure.

FIG. 3 is a diagram illustrating the process 300 of hashing biometric data 340 obtained from blood 311 of a user 105 to generate a biometric digital signature 350 for the user 105, in accordance with at least one embodiment of the present disclosure. In this figure, a blood sample 310 is first obtained by extracting blood 311 from a finger of the user 105. At least one chemical detector device (e.g., sensor) determines at least a portion of the DNA sequence 320 (e.g., biometric information, e.g., comprising nucleotides) of the blood 311. The DNA sequence 320 (e.g., biometric information, e.g., comprising nucleotides) is converted to biometric data (e.g., digital data, such as a binary number 330 and/or a hexadecimal number 340). At least a portion of the biometric data (e.g., a binary number 330 or a hexadecimal number 340) is hashed utilizing a fuzzy hash algorithm (or alternatively a hash algorithm) to generate a biometric digital signature 350 for the user 105.

Figure 4:
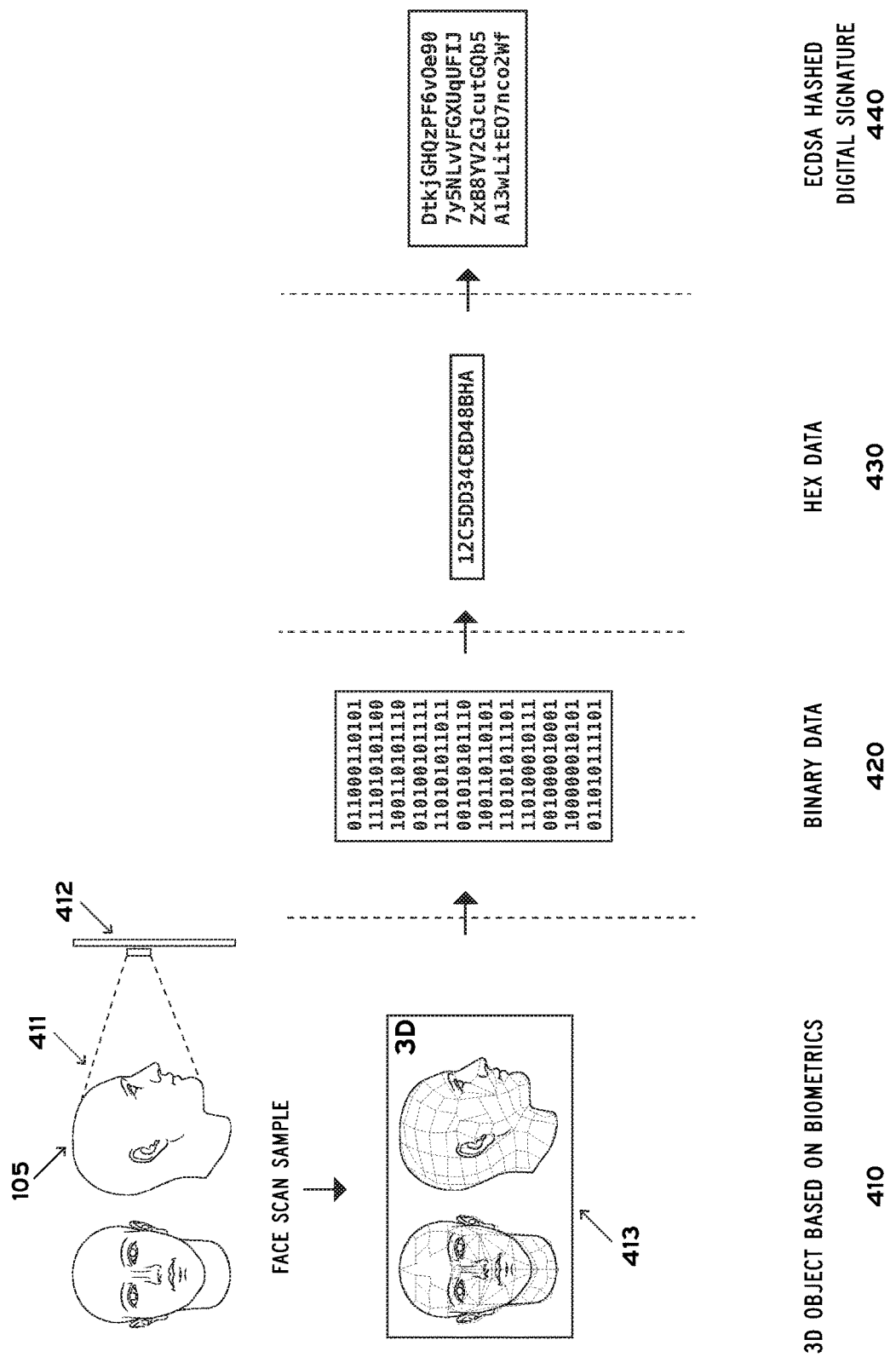
FIG. 4 is a diagram illustrating the process of hashing biometric data obtained from a facial scan of a user to generate a biometric digital signature for the user, in accordance with at least one embodiment of the present disclosure.

FIG. 4 is a diagram illustrating the process 400 of hashing biometric data 340 obtained from a facial scan 410 of a user 105 to generate a biometric digital signature 350 for the user 105, in accordance with at least one embodiment of the present disclosure. In this figure, a facial scan 413 (e.g., an image generated from a three-dimensional object based on biometrics 410) (i.e. biometric information) is first obtained (e.g., sensed and/or imaged) by scanning, with an image scanner 412, at least a portion of a face 411 of the user 105. The facial scan 413 (i.e. biometric information) is converted to biometric data (e.g., digital data, such as a binary number 420 and/or a hexadecimal number 430). At least a portion of the biometric data (e.g., a binary number 420 or a hexadecimal number 430) is hashed utilizing a fuzzy hash algorithm (or alternatively a hash algorithm to generate a biometric digital signature 440 for the user 105.

Figure 5:
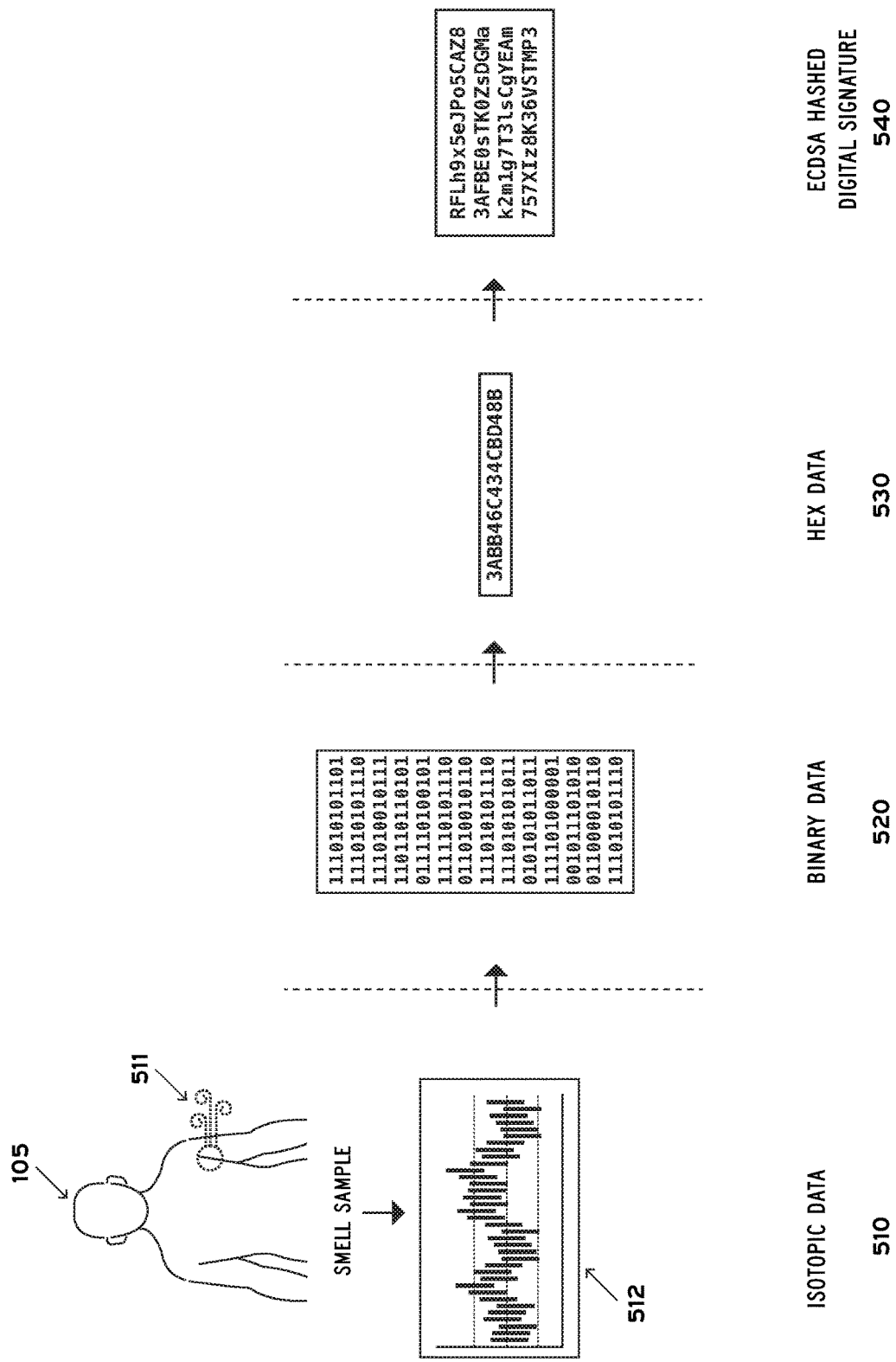
FIG. 5 is a diagram illustrating the process of hashing biometric data obtained from a scent of a user to generate a biometric digital signature for the user, in accordance with at least one embodiment of the present disclosure.

FIG. 5 is a diagram illustrating the process 500 of hashing biometric data 530 obtained from a scent 511 of a user 105 to generate a biometric digital signature 540 for the user 105, in accordance with at least one embodiment of the present disclosure. In this figure, an odor (e.g., scent, pheromone) sample 511 is first sensed from the user 105. At least one chemical detector device (e.g., sensor) determines a chemical composition (e.g., biometric information, e.g., comprising isotopic data 510) 512 of the odor sample 511. The chemical composition (e.g., biometric information, e.g., comprising isotopic data 510) 512 is converted to biometric data (e.g., digital data, such as a binary number 520 and/or a hexadecimal number 530). At least a portion of the biometric data (e.g., a binary number 520 or a hexadecimal number 530) is hashed utilizing a fuzzy hash algorithm (or alternatively a hash algorithm) to generate a biometric digital signature 540 for the user 105.

Figure 6:
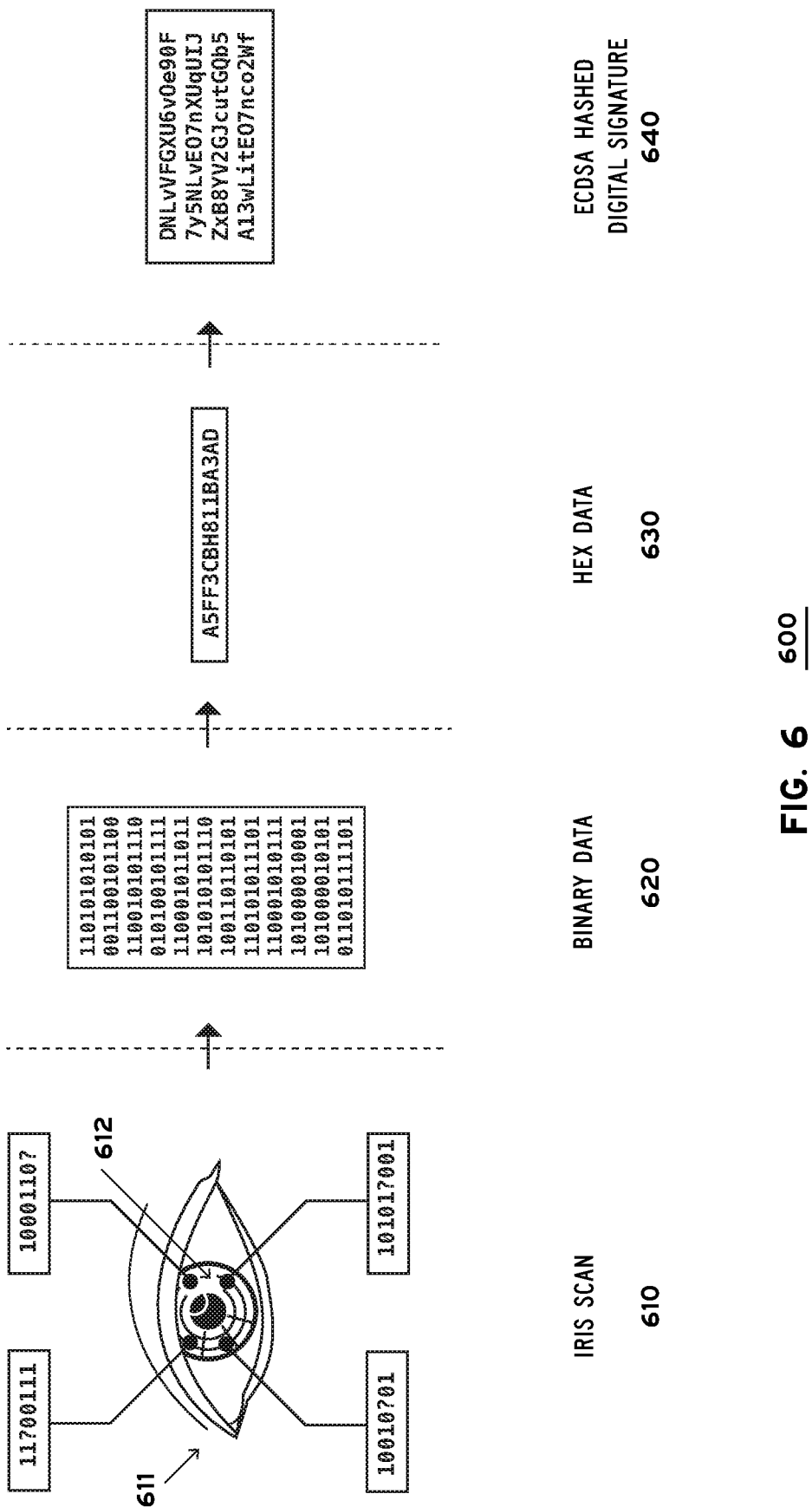
FIG. 6 is a diagram illustrating the process of hashing biometric data obtained from an eye scan of a user to generate a biometric digital signature for the user, in accordance with at least one embodiment of the present disclosure.

FIG. 6 is a diagram illustrating the process 600 of hashing biometric data 630 obtained from an eye scan (e.g., iris scan and/or retina scan) 610 of a user 105 to generate a biometric digital signature 640 for the user 105, in accordance with at least one embodiment of the present disclosure. In this figure, an eye 611 of the user 105 is scanned with a scanner (e.g., an imager, a sensor) to obtain an iris scan (i.e. biometric information) 610 of at least a portion of the iris 612 of the user 105. The iris scan 610 (i.e. biometric information) is converted to biometric data (e.g., digital data, such as a binary number 620 and/or a hexadecimal number 630). At least a portion of the biometric data (e.g., a binary number 620 or a hexadecimal number 630) is hashed utilizing a fuzzy hash algorithm (or alternatively a hash algorithm) to generate a biometric digital signature 640 for the user 105.

Figure 7:
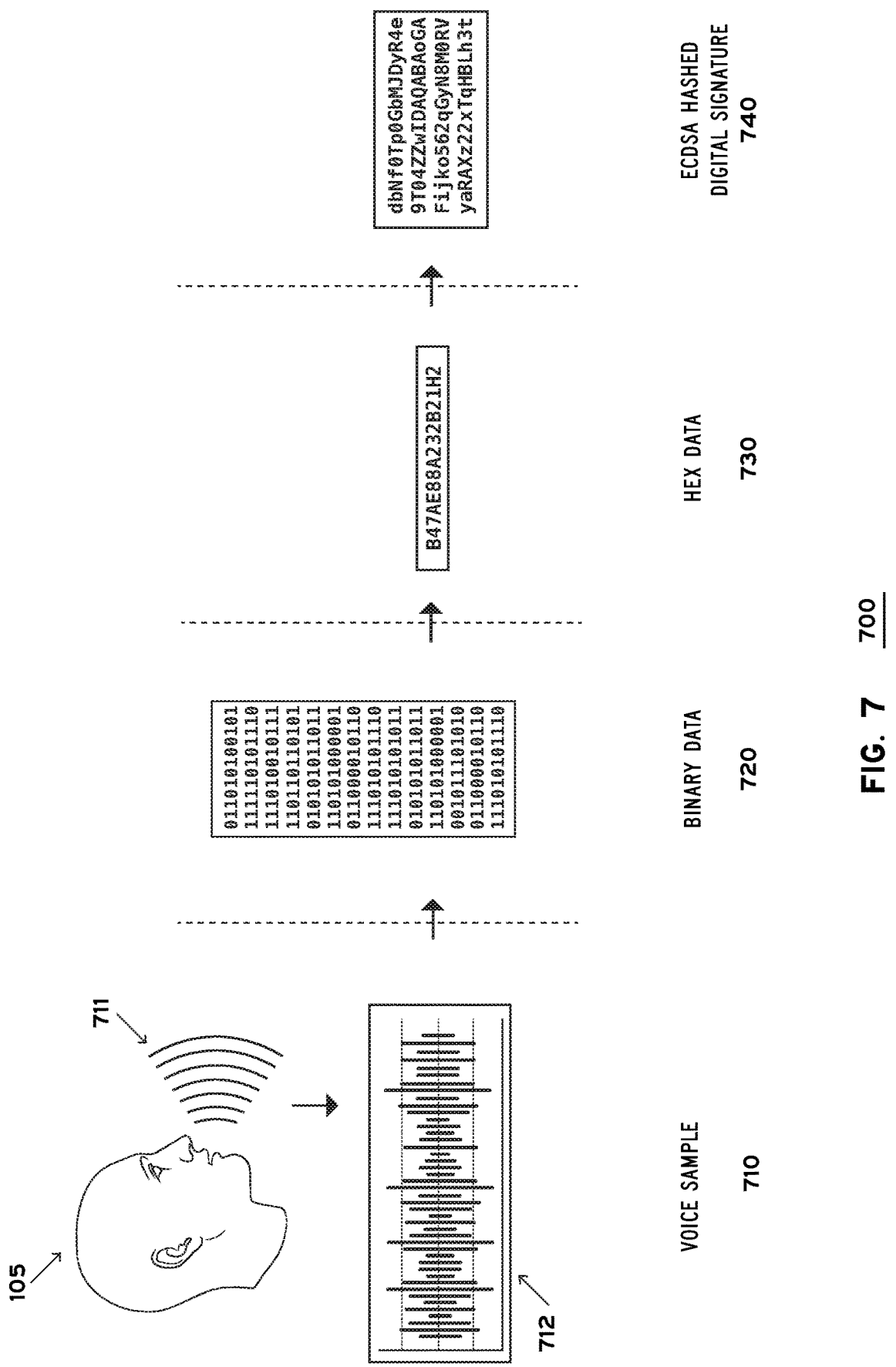
FIG. 7 is a diagram illustrating the process of hashing biometric data obtained from a voice of a user to generate a biometric digital signature for the user, in accordance with at least one embodiment of the present disclosure.

FIG. 7 is a diagram illustrating the process 700 of hashing biometric data 730 obtained from a voice 711 of a user 105 to generate a biometric digital signature 740 for the user 105, in accordance with at least one embodiment of the present disclosure. In this figure, a voice sample 710 is obtained by sensing a voice 711 from the user 105. At least one audio receiver device (e.g., sensor, microphone) senses (e.g., records) the voice 711 (e.g., biometric information, e.g., comprising audio information 712) from the user 105. The biometric information (e.g., comprising audio information 712) of the voice 711 is converted to biometric data (e.g., digital data, such as a binary number 720 and/or a hexadecimal number 730). At least a portion of the biometric data (e.g., a binary number 720 or a hexadecimal number 730) is hashed utilizing a fuzzy hash algorithm (or alternatively a hash algorithm) to generate a biometric digital signature 740 for the user 105.

Figure 8:
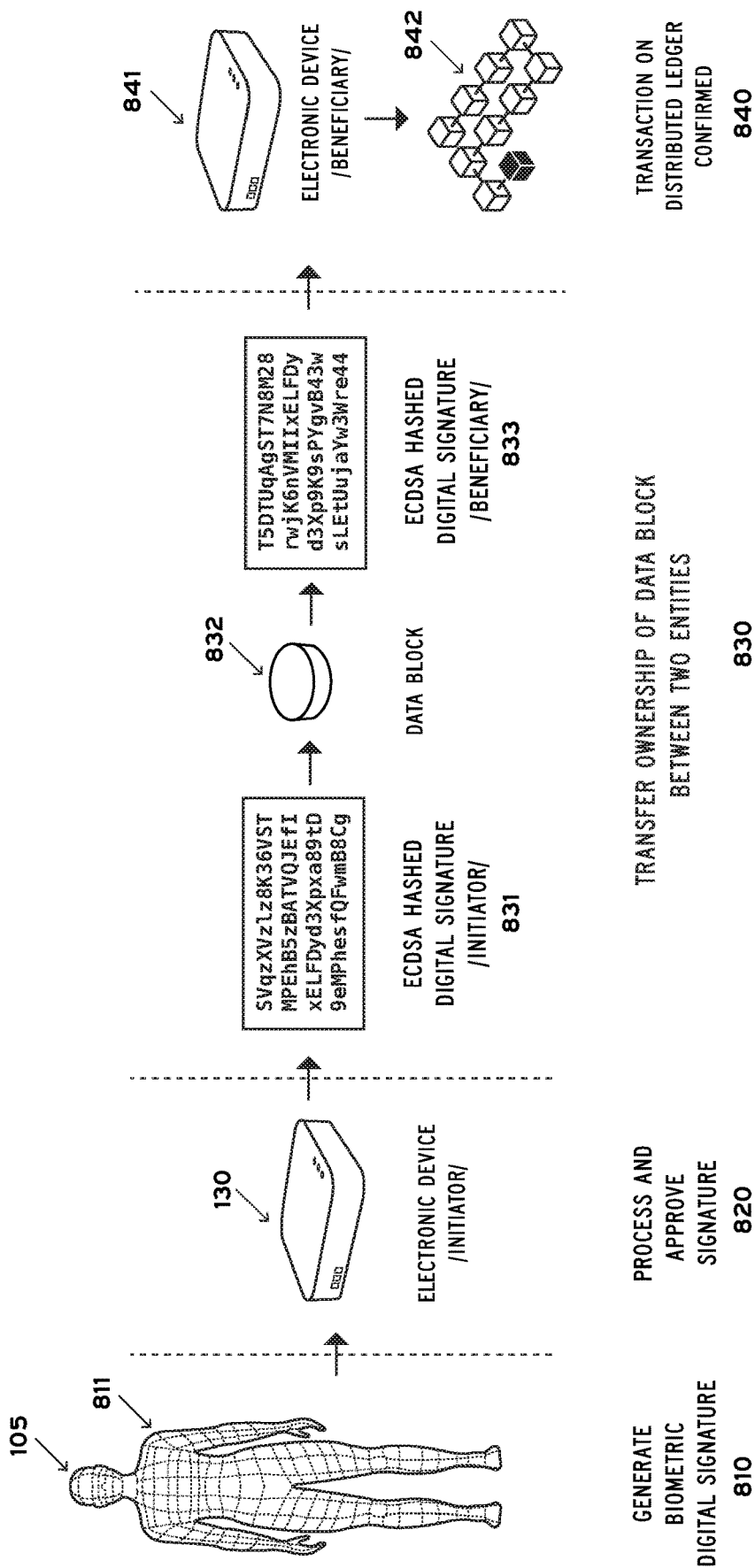
FIG. 8 is a diagram illustrating the process of utilizing biometric digital signatures for the transfer of a property between an initiator (e.g., a user) and a beneficiary, in accordance with at least one embodiment of the present disclosure.

FIG. 8 is a diagram illustrating the process 800 of utilizing biometric digital signatures 831, 833 for the transfer of a property 832 between an initiator (e.g., a user) and a beneficiary, in accordance with at least one embodiment of the present disclosure. In this figure, a user (e.g., initiator)

105 desires to transfer a data block 832, which is assigned to the user (e.g., initiator) 105, on a blockchain distributed ledger 842 to a beneficiary. A biometric digital signature 831 is first generated 810 for the user (e.g., initiator) 105. For the generation of a biometric digital signature 831, biometric information (e.g., a three-dimensional (3D) body scan) 811 is obtained from the user (e.g., an initiator) 105. An electronic device (e.g., a user device) 130 associated with the user (e.g., an initiator) 105 hashes, utilizing a fuzzy hash algorithm (or alternatively a hash algorithm), biometric data from the biometric information 811 to generate a biometric digital signature 831 for the user (e.g., initiator) 105. Also, a biometric digital signature 833 for the beneficiary is generated and provided by an electronic device (e.g., user device) 841 associated with the beneficiary.

After the biometric digital signature 831 is validated and the user (e.g., initiator) 105 is verified (refer to FIG. 9 for that process), the data block 832 is transferred on the blockchain 842 from the user (e.g., initiator) 105 to the beneficiary, and the transaction on the distributed ledger is confirmed 840. For the transfer of the data block 832, the biometric digital signature 831 for the user (e.g., initiator) 105 will no longer be assigned to the data block 832, and instead the biometric digital signature 833 for the beneficiary will be assigned to that data block 832.

Figure 9:
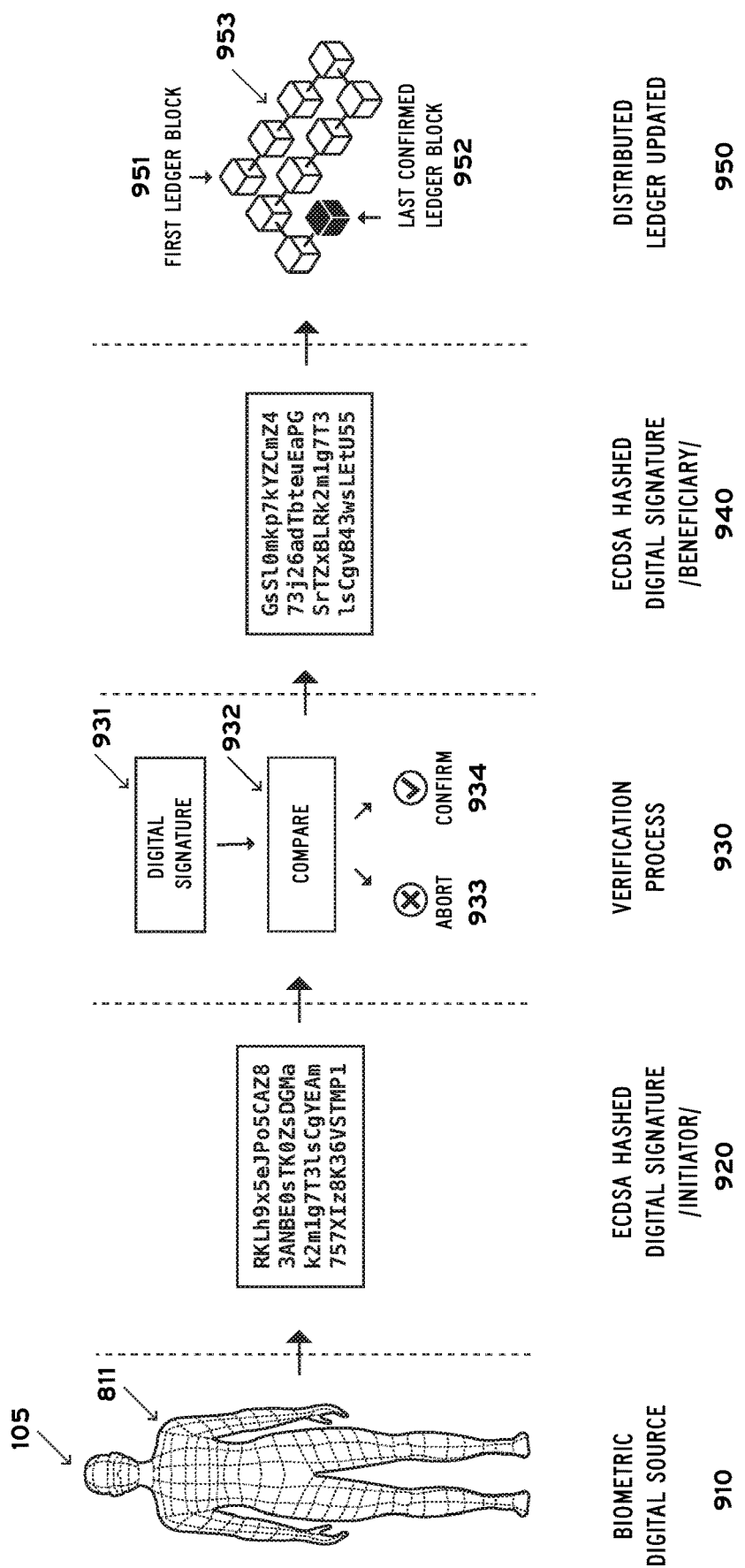
FIG. 9 is a diagram illustrating the process of verifying a user by validating the biometric digital signature for the user to perform a transaction desired by the user, in accordance with at least one embodiment of the present disclosure.

FIG. 9 is a diagram illustrating the process 900 of verifying a user (e.g., initiator) 105 by validating the biometric digital signature 920 for the user 105 to perform a transaction desired by the user 105, in accordance with at least one embodiment of the present disclosure. During the verification process 930, the generated biometric digital signature 920 for the user (e.g., initiator) 105 is compared 932 to a previous biometric digital signature 931 for the user (e.g., initiator) 105. If the generated biometric digital signature 920 for the user (e.g., initiator) 105 is found to be identical to the previous biometric digital signature 931 for the user (e.g., initiator) 105, the generated biometric digital signature 920 is confirmed 934, and the distributed ledger is updated 950 by transferring a data block 951 of a blockchain 953 from the user (e.g., initiator) 105 to a beneficiary. For the transfer of the data block 951, the biometric digital signature 920 for the user (e.g., initiator) 105 will no longer be assigned to the data block 951, and instead the biometric digital signature 940 for the beneficiary will be assigned to that data block 951.

However, if the generated biometric digital signature 920 for the user (e.g., initiator) 105 is not found to be identical to the previous biometric digital signature 931 for the user (e.g., initiator) 105, the generated biometric digital signature 920 is aborted 933, and the user 105 will not be able to conduct the transaction.

Figure 10:
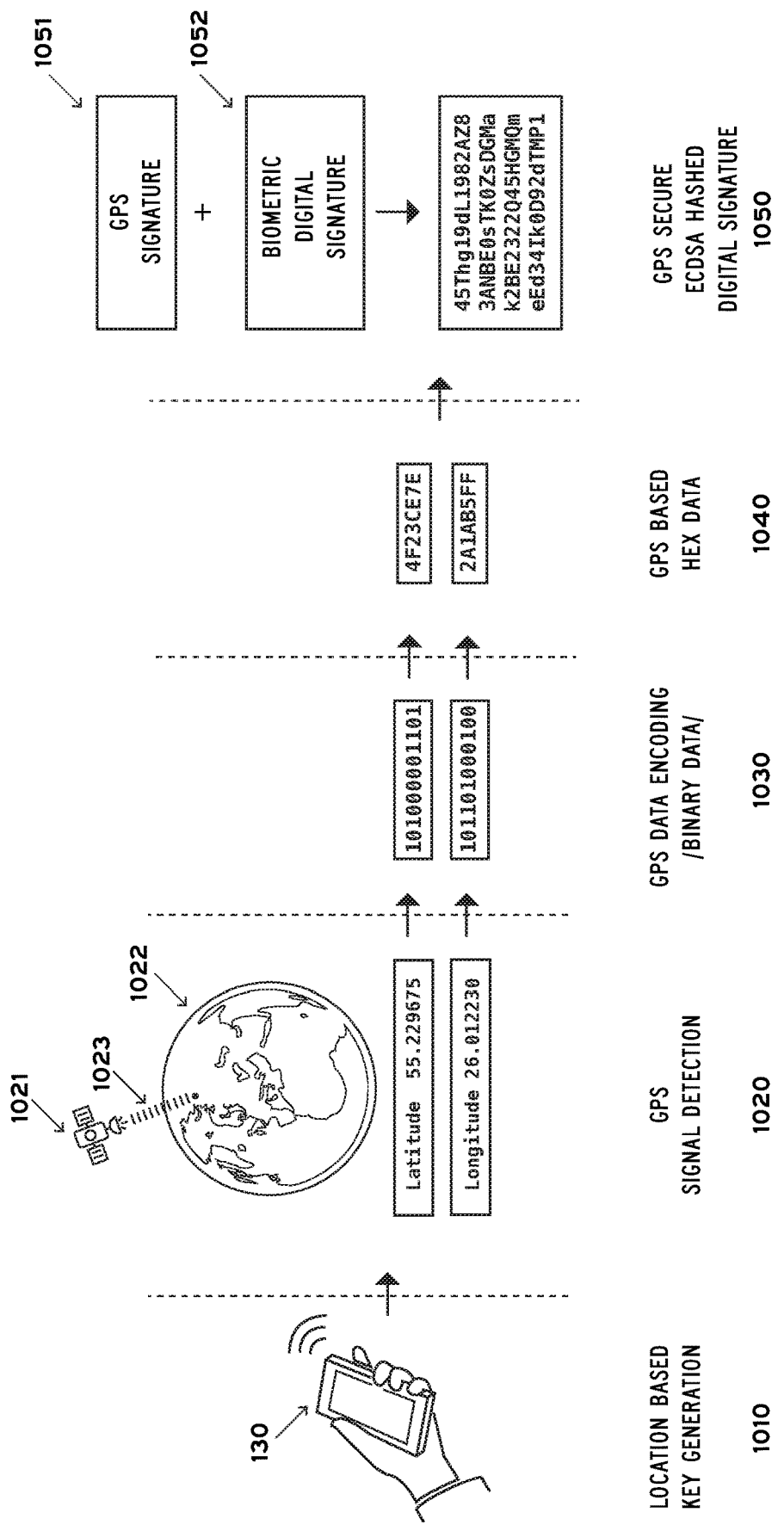
FIG. 10 is a diagram illustrating the process of hashing location data for a user along with biometric data obtained from a user to generate a biometric digital signature for the user, in accordance with at least one embodiment of the present disclosure.

FIG. 10 is a diagram illustrating the process 1000 of hashing location data (e.g., latitude, longitude) 1051 for a user 105 along with biometric data 1052 obtained from a user 105 to generate a biometric digital signature 1050 for the user 105, in accordance with at least one embodiment of the present disclosure. In this figure, a user device 130 of the user 105 obtains location information (e.g., latitude and longitude) for the user 105, for example via Global Positioning System (GPS) signal detection 1020 by receiving a GPS signal 1023 radiating from a GPS satellite 1021 onto Earth 1022. The location information (e.g., latitude and longitude) is converted into a binary number 1030 (e.g., the GPS data is encoded into binary data 1030) and/or a hexadecimal number 1040 (e.g., the GPS data is hexadecimal 1040). It should be noted that, in other embodiments, the user device 130 may obtain location information (e.g., latitude and longitude) for the user 105 by utilizing various different positioning systems other than GPS including, but not limited to, Global Navigation Satellite System (GLONASS), Galileo, Compass (BeiDou), or Quazi-Zenith Satellite System (QZSS).

The GPS data (e.g., comprising a binary number 1030 and/or a hexadecimal number 1040) is hashed utilizing a hash algorithm or alternatively a fuzzy hash algorithm to generate a GPS signature 1051 for the user 105. In addition, biometric data for the user 105 is hashed utilizing a fuzzy hash algorithm (or alternatively a hash algorithm) to generate a biometric digital signature 1052 for the user 105. The GPS signature 1051 and the biometric digital signature 1052 together form the complete biometric digital signature (e.g., a GPS secure biometric digital signature) 1050 for the user 105.

Figure 11:
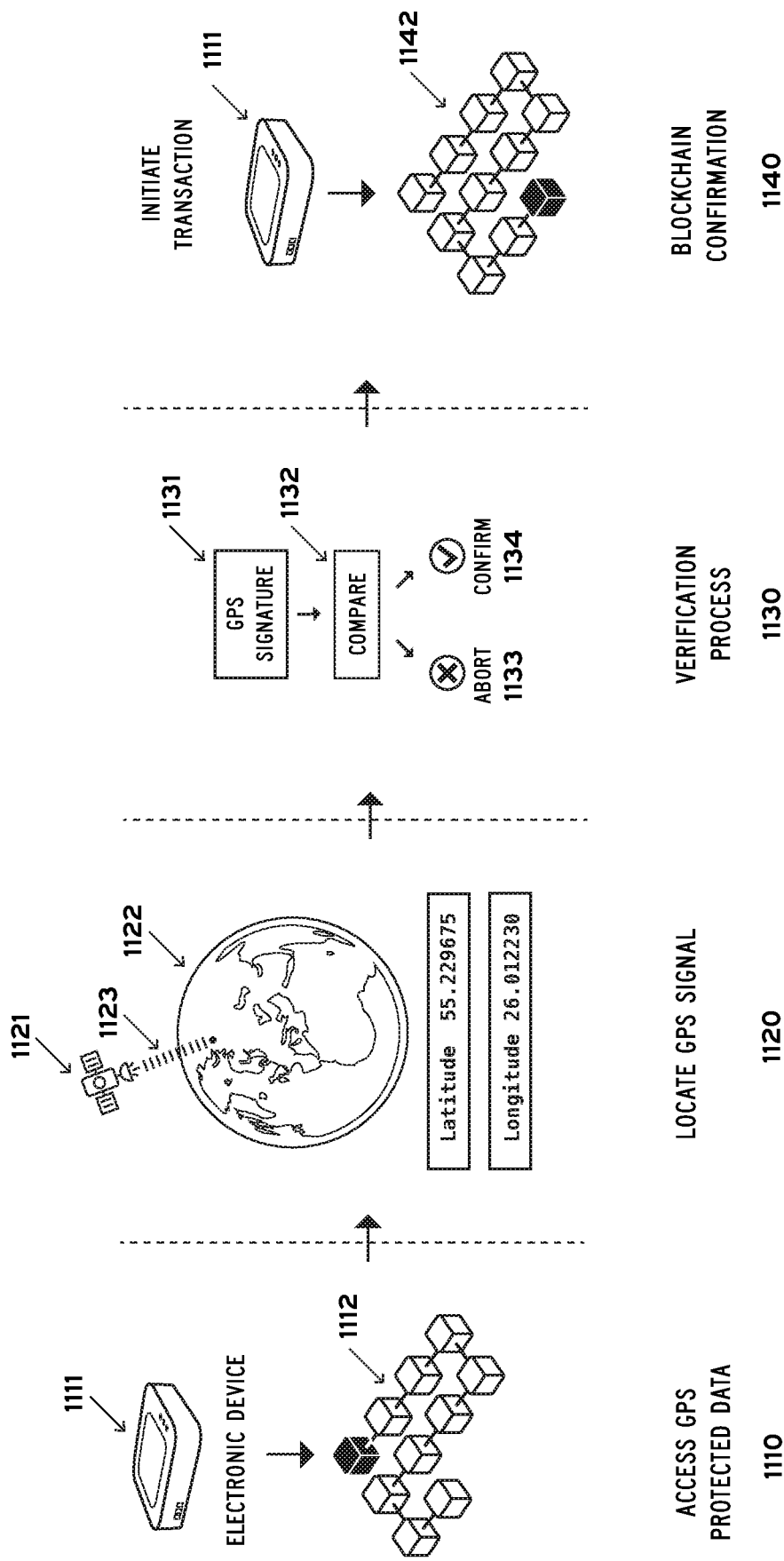
FIG. 11 is a diagram illustrating the process of verifying the user by validating the satellite (e.g., Global Positioning System (GPS) satellite) signature, which comprises location data, for the user of FIG. 11 to perform a transaction desired by the user, in accordance with at least one embodiment of the present disclosure.

FIG. 11 is a diagram illustrating the process 1100 of verifying the user 105 by validating the satellite (e.g., GPS satellite) signature, which comprises location data (e.g., latitude and longitude), for the user 105 of FIG. 11 to perform a transaction desired by the user 105, in accordance with at least one embodiment of the present disclosure. In this figure, the user 105 wishes to transfer assignment of a data block (e.g., access protected data 1110, such as a data block in a blockchain 1112) to a beneficiary. In order to complete this transaction, the user 105 needs to be verified. For this embodiment, the user 105 is verified by validating the biometric digital signature of the user 105 and validating the location of the user 105. In the embodiment of this figure, the biometric digital signature of the user 105 has already been validated.

In order to validate the location of the user 105, the user device 1111 of the user 105 obtains location information (e.g., latitude and longitude) for the user 105, for example via Global Positioning System (GPS) by receiving a GPS signal 1123 radiating from a GPS satellite 1121 onto Earth 1122 (e.g. locating a GPS signal 1120). The location information (e.g., latitude and longitude) is converted into a binary number (e.g., the GPS data is encoded into binary data) and/or a hexadecimal number (e.g., the GPS data is hexadecimal). The GPS data (e.g., comprising a binary number and/or a hexadecimal number) is hashed utilizing a hash algorithm (or alternatively a fuzzy hash algorithm) to generate a GPS signature 1131 for the user 105.

During the verification process 1130, the generated GPS signature 1131 for the user (e.g., initiator) 105 is compared 1132 to a previous GPS signature 1051 (refer to FIG. 10) for the user (e.g., initiator) 105. If the generated GPS signature 1131 for the user (e.g., initiator) 105 is found to be identical to the previous GPS signature 1051 for the user (e.g., initiator) 105, the generated GPS signature 1131 is confirmed 1134, and the transaction is initiated (e.g., blockchain confirmation 1140) by the distributed ledger being updated by transferring a data block of a blockchain 1142 from the user (e.g., initiator) 105 to a beneficiary.

However, if the generated GPS signature 1131 for the user (e.g., initiator) 105 is not found to be identical to the previous GPS signature 1051 for the user (e.g., initiator) 105, the generated GPS signature 1131 is aborted 1133, and the user 105 will not be able to conduct the transaction.

Figure 12:
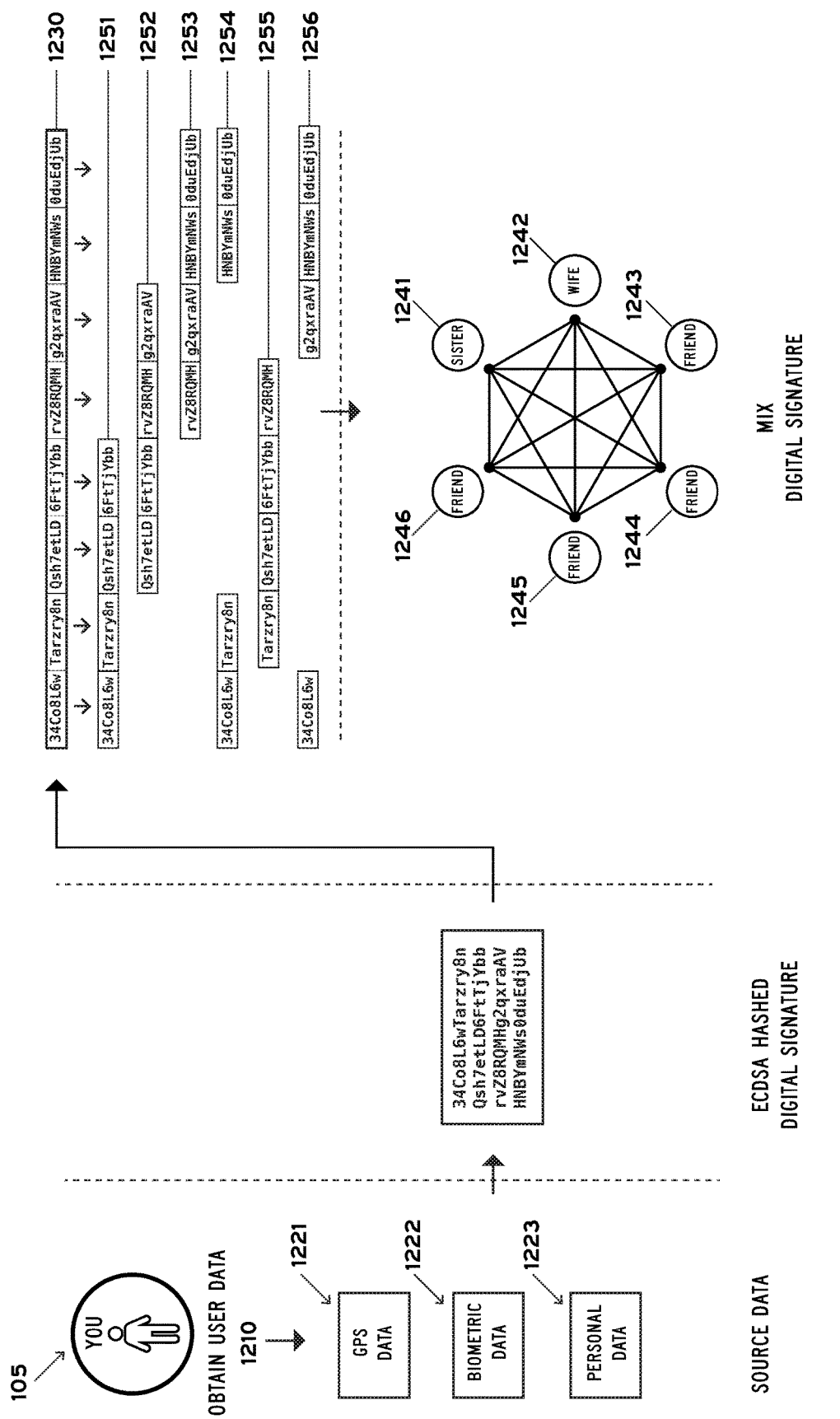
FIG. 12 is a diagram illustrating the process of storing a portion of a biometric digital signature for a user to host biometric digital signatures held by other people to generate the host biometric digital signatures for each of the other people, in accordance with at least one embodiment of the present disclosure.

FIG. 12 is a diagram illustrating the process 1200 of storing a portion of a biometric digital signature 1230 for a user ("You") 105 to host biometric digital signatures 1251-1256 held by other people 1241-1246 to generate the host biometric digital signatures 1251-1256 for each of the other people 1241-1246, in accordance with at least one embodiment of the present disclosure. For this embodiment, people 1241-1246, who are related and/or associated with the user 105, may each have a host biometric digital signature 1251-1256 that comprises a portion of the biometric digital signature 1230 for the user 105 so that the user 105 may use their host biometric digital signatures 1251-1256 to reconstruct the complete biometric digital signature 1230 for the user 105.

In this figure, user data (e.g., source data 1220, such as GPS data 1221, biometric data 1222, and/or personal data 1223) is first obtained 1210 from the user 105. The user data (e.g., source data 1220) is hashed using a fuzzy hash algorithm (or alternatively a hash algorithm) to generate a biometric digital signature 1230 for the user 105.

A portion of the biometric digital signature 1230 of the user 105 is stored for each host biometric digital signature 1251-1256 for each of the persons 1241-1246 (e.g., n number of people, e.g., six (6)) to generate a host biometric digital signature 1251-1256 for each of the people 1241-1246, such that a combination of the host biometric digital signatures 1251-1256 for at least a portion of the people (e.g., m number of the people, e.g., four (4)) 1241-1244 comprises all of the biometric digital signature 1230 for the user 105, where m number is a number greater than half of n number.

For example, in one embodiment, the biometric digital signature 1230 of the user 105 comprises 64 characters, and each of the host biometric digital signatures 1251-1256 for the people 1241-1246 comprise a portion of the total number of characters (e.g., 32 characters). As such, for example, each host biometric digital signature 1251-1256 for the people 1241-1246 comprises a total of 32 characters. It should be noted that in other embodiments, the host biometric digital signature 1251-1256 for the people 1241-1246 may each comprise more or less than a total of 32 characters, and/or may each comprise a different number of characters to each other (e.g., half of the host biometric digital signatures 1251-1253 may comprise a total of 30 characters, and the other half of the host biometric digital signatures 1254-1256 may comprise a total of 34 characters).

Figure 13:
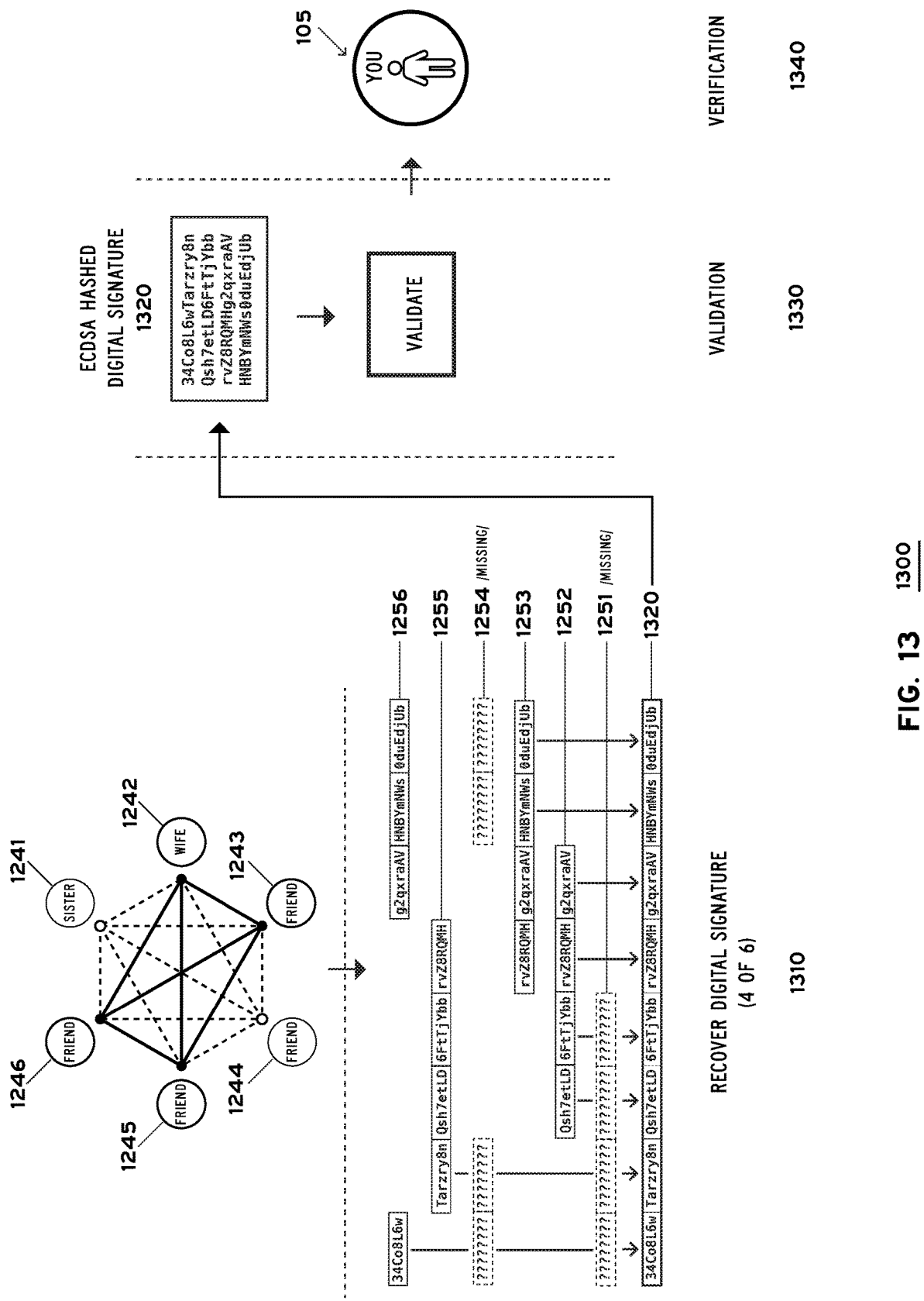
FIG. 13 is a diagram illustrating the process of using the host biometric digital signatures from the people of FIG. 12 to generate a reconstructed biometric digital signature for the user, in accordance with at least one embodiment of the present disclosure.

FIG. 13 is a diagram illustrating the process 1300 of using the host biometric digital signatures 1251-1256 from the people 1241-1246 of FIG. 12 to generate a reconstructed biometric digital signature 1320 for the user 105, in accordance with at least one embodiment of the present disclosure. In this figure, host biometric digital signatures 1252, 1253, 1255, 1256 from m (e.g., four (4)) number of then (e.g., six (6)) number of the people 1242, 1243, 1245, 1246 are used to reconstruct the biometric digital signature 1320 for the user 105. Then, the reconstructed biometric digital signature 1320 for the user 105 can then be validated 1330 for the user 105 to be verified 1340.

Figure 14:
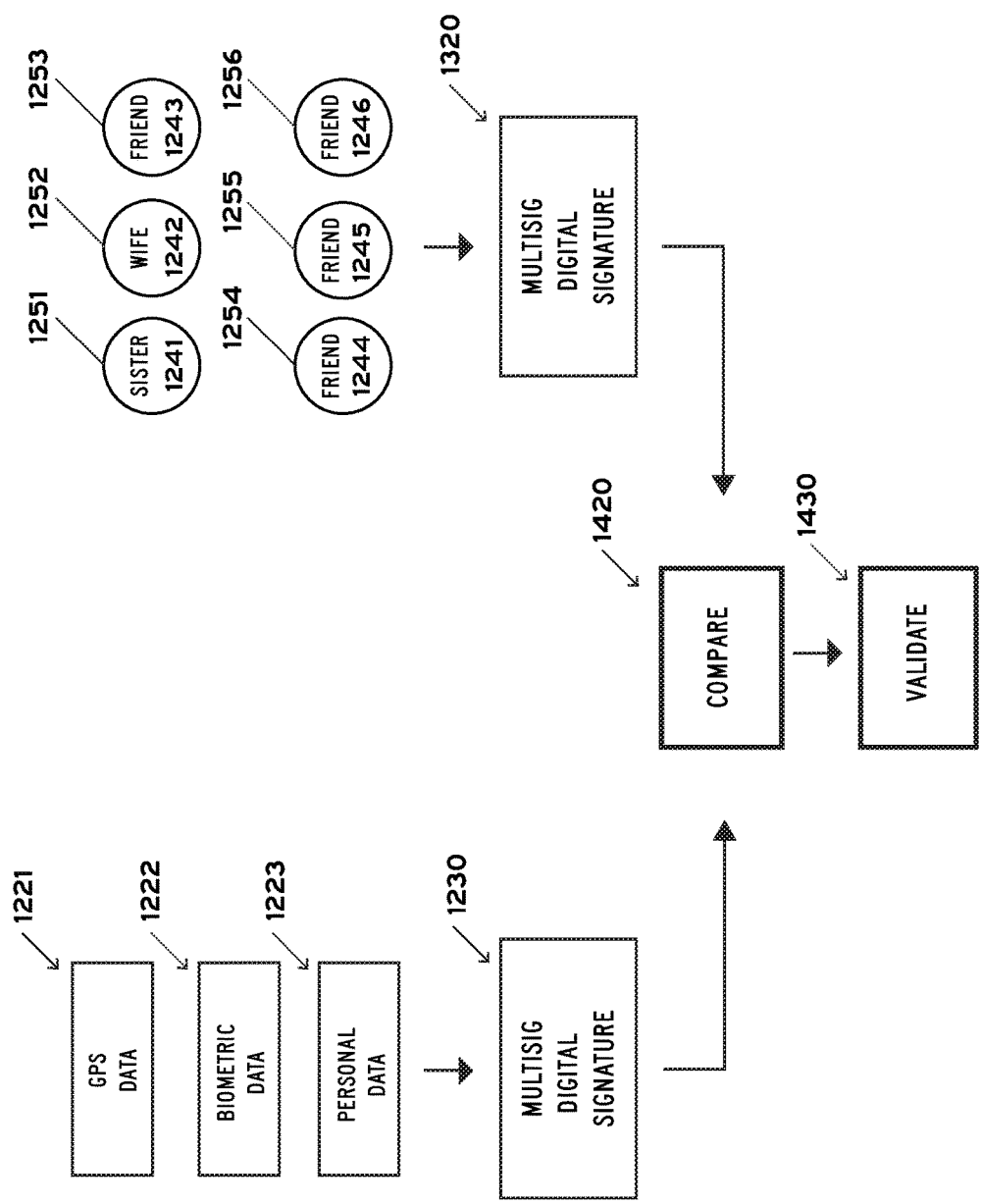
FIG. 14 is a diagram illustrating the process of verifying the user by validating the reconstructed biometric digital signature for the user of FIG. 13, in accordance with at least one embodiment of the present disclosure.

FIG. 14 is a diagram illustrating the process 1400 of verifying the user 105 by validating the reconstructed biometric digital signature 1320 for the user 105 of FIG. 13, in accordance with at least one embodiment of the present disclosure. In this figure, GPS data 1221, biometric data 1222, and/or personal data 1223 from the user 105 is hashed using a fuzzy hash algorithm (or alternatively a hash algorithm) to generate a biometric digital signature 1230 for the user 105. Host biometric digital signatures 1252, 1253, 1255, 1256 from m (e.g., four (4)) number of the n (e.g., six (6)) number of the people 1242, 1243, 1245, 1246 are used to reconstruct the biometric digital signature 1320 for the user 105. The reconstructed biometric digital signature 1320 is compared 1420 to the biometric digital signature 1230 for the user 105. If the reconstructed the biometric digital signature 1320 for the user 105 is found to be identical to the biometric digital signature 1230 for the user 105, the reconstructed the biometric digital signature 1320 is validated 1430.

Figure 15:
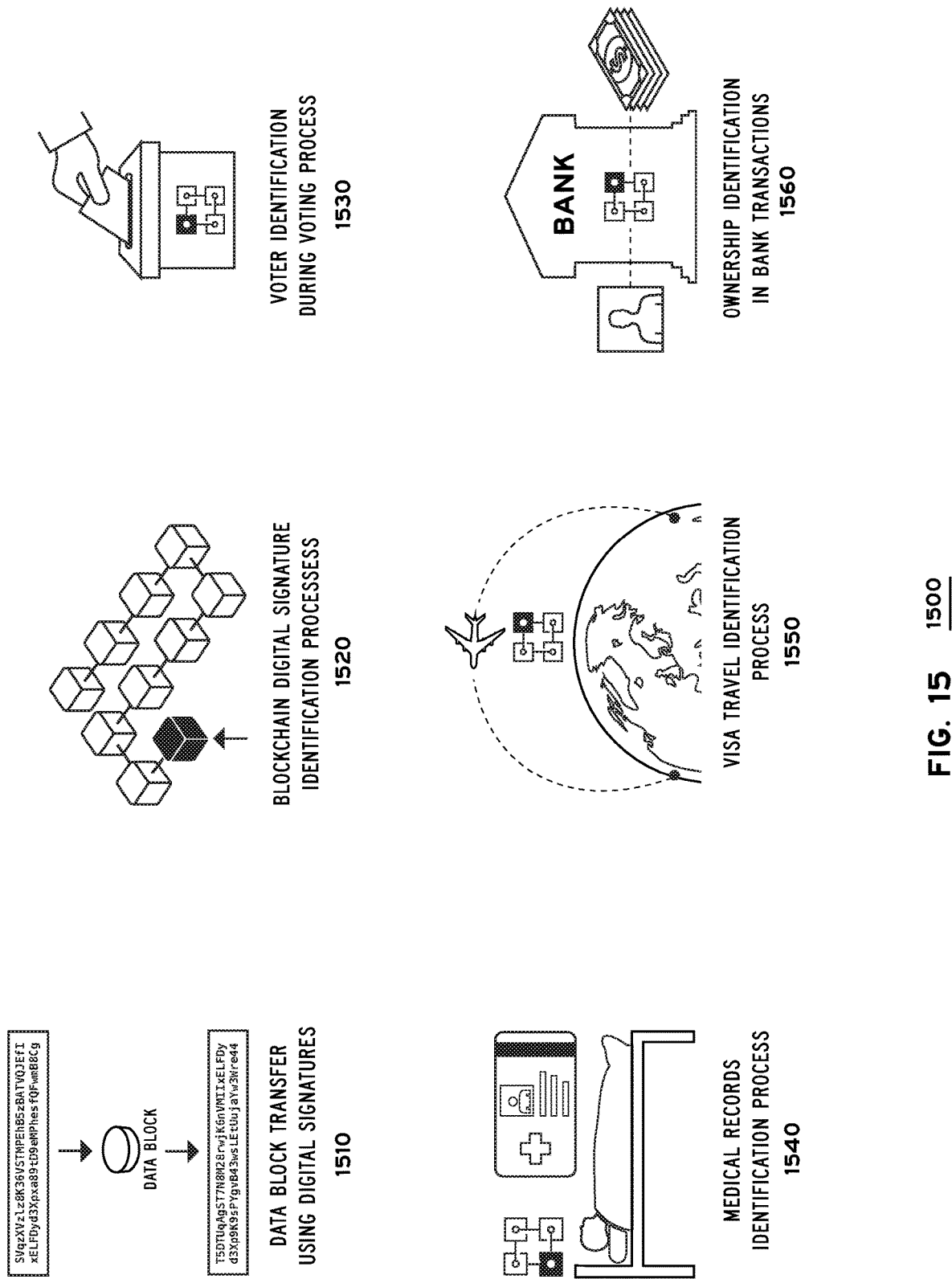
FIG. 15 is a diagram illustrating various different types of transactions that may occur after the user is verified by validating the biometric digital signature for the user, in accordance with at least one embodiment of the present disclosure.

FIG. 15 is a diagram illustrating various different types of transactions that may occur after the user 105 is verified by validating the biometric digital signature for the user 105, in accordance with at least one embodiment of the present disclosure. As shown in this figure, the various different types of transactions that may occur include, but are not limited to, the transferring the assignment of data blocks on a blockchain using biometric digital signatures 1510, identification of assignment of data blocks on a blockchain using biometric digital signatures 1520, identification of a user 105 for casting a vote during a voting process 1530, identification of a user 105 for obtaining medical records 1540, identification of user 105 for obtaining travel documentation 1550, and identification of ownership of bank accounts for conducting bank transactions using biometric digital signatures 1560.

FIG. 16 is a diagram illustrating various different types of additional identifying information that may be hashed along with biometric data obtained from the user 105 to generate a biometric digital signature for the user 105, in accordance with at least one embodiment of the present disclosure. As shown in this figure, the various different types of additional identifying information that may be utilized include, but are not limited to, temperature of the environment 1610, humidity of the environment 1620, a calendar date range 1630, a time range 1640, an elevation range 1650, and a cardinal direction range 1660.

Figure 17:
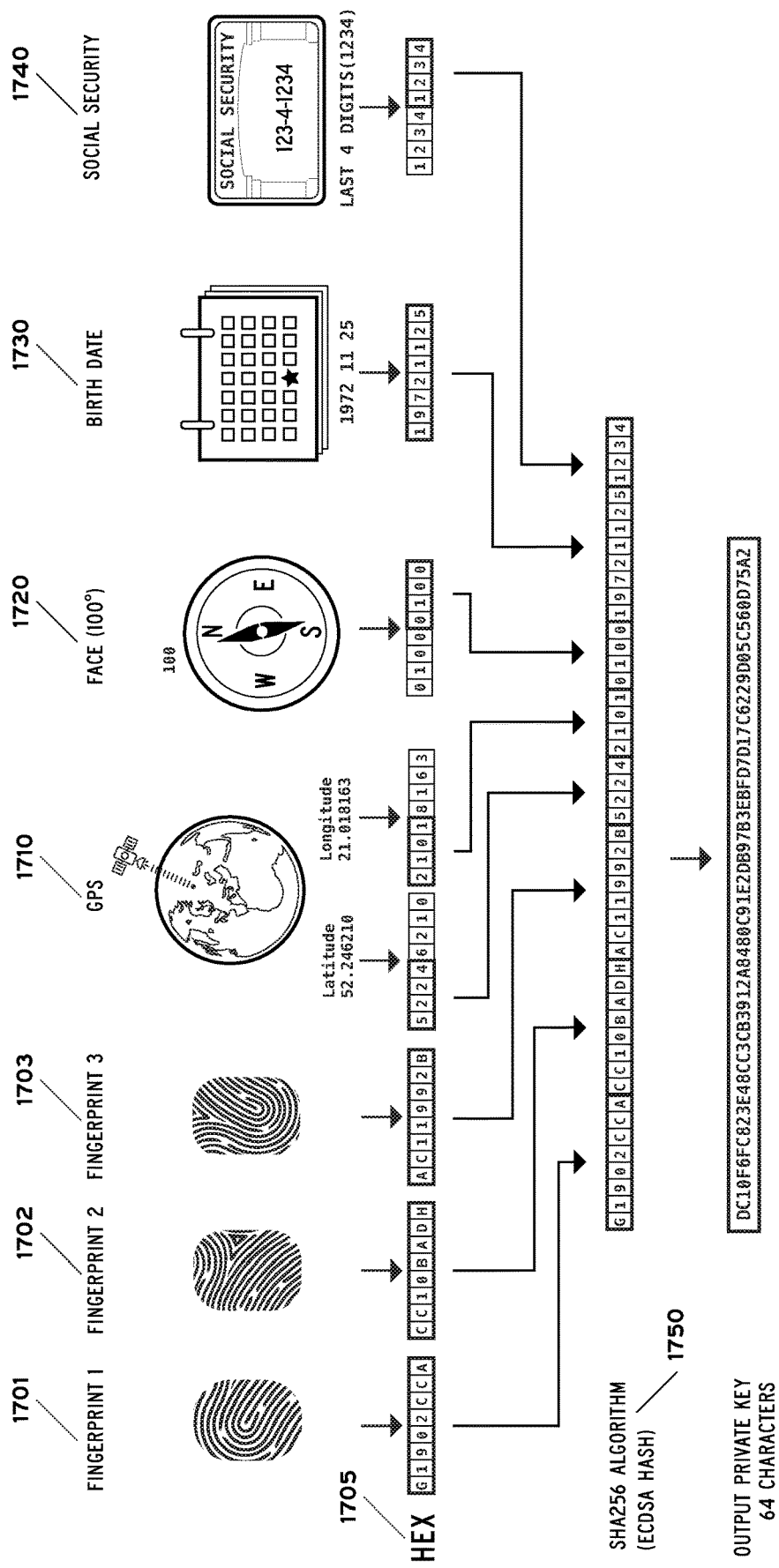
FIG. 17 is a diagram illustrating the process of generating a biometric digital signature for a user by hashing biometric data from the user along with additional identifying information and personal information for the user, in accordance with at least one embodiment of the present disclosure.

FIG. 17 is a diagram illustrating the process 1700 of generating a biometric digital signature 1760 for a user 105 by hashing biometric data 1701, 1701, 1703 from the user 105 along with additional identifying information 1710, 1720 and personal information 1730, 1740 for the user 105, in accordance with at least one embodiment of the present disclosure. In this figure, biometric information, in the form of fingerprints 1701, 1701, 1703, is obtained from the user 105. Biometric data (in the form of hexadecimal numbers 1705) is generated from the biometric information of the fingerprints 1701, 1701, 1703.

Also, additional identifying information is obtained for the user 105. The additional identifying information comprises GPS location information (e.g., latitude and longitude) 1710 and cardinal direction information 1720. Digital numbers (e.g., hexadecimal numbers 1705) are generated from the additional identifying information.

In addition, personal information is obtained from the user 105. The personal information comprises the birth date 1730 of the user 105 and the last four digits of the user's 105 social security number. Digital numbers (e.g., hexadecimal numbers 1705) are generated from the personal information.

The digital numbers 1750 (e.g., all of the hexadecimal numbers 1705) for the biometric information (e.g., fingerprints 1701, 1703, 1703), the additional identifying information (e.g., GPS location information 1710 and cardinal direction information 1720), and the personal information (e.g., birth date 1730 and last four digits of the social security number 1740) are hashed using a fuzzy hash algorithm (or alternatively a hash algorithm) to generate the biometric digital signature 1760 for the user 105.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for identity verification of a user, the method comprising:
   sensing, by at least one sensor, biometric information from the user;
   generating, by a sensor device, biometric data from the biometric information;
   transmitting, by the sensor device, the biometric data to a user device;
   hashing, by the user device, at least a portion of the biometric data and at least a portion of additional identifying information to generate a biometric digital signature for the user;
   storing, by the user device, at least a portion of the biometric digital signature for the user to a host biometric digital signature of user devices corresponding to each of at least n number of persons, such that a combination of the host biometric digital signatures for at least m number of the n number of persons comprises all of the biometric digital signature for the user, wherein the m number is a number greater than half of the n number;
   transmitting, by the user device, the biometric digital signature to a verification node;
   obtaining, by the verification node, host biometric digital signatures from other user devices corresponding to other users associated with the user, wherein each of the host biometric digital signatures comprise a portion of a previous biometric digital signature for the user;
   reconstructing, by the verification node, the previous biometric digital signature from the portions of the host biometric digital signatures;
   comparing, by the verification node, the biometric digital signature to the previous biometric digital signature for the user; and
   verifying, by the verification node, the user when the verification node determines that the biometric digital signature is identical to the previous biometric digital signature for the user.

2. The method of claim 1, further comprising, when the user is verified, generating and transmitting, by the verification node to the user device, a confirmation verification signal indicating that the user is verified.

3. The method of claim 1, further comprising not verifying, by the verification node, the user when the verification node determines that the biometric digital signature is not identical to the previous biometric digital signature for the user.

4. The method of claim 3, further comprising, when the user is not verified, generating and transmitting, by the verification node to the user device, an abort verification signal indicating that the user is not verified.

5. The method of claim 1, wherein when the user is verified, the method further comprises at least one of:
   allowing the user to transfer assignment of a data block from the user to a beneficiary;
   allowing the user to transfer ownership of property from the user to the beneficiary;
   allowing the user to obtain medical records for the user;
   allowing the user to vote on behalf of the user;
   allowing the user to obtain travel documentation for the user; or
   allowing the user to make banking transactions on behalf of the user.

6. The method of claim 1, wherein the biometric information comprises at least one of at least three fingerprints, at least a portion of a deoxyribonucleic acid (DNA) sequence, at least a portion of at least one facial feature, isotopic information from odor, at least a portion of an eye feature, audio information from a voice, a three-dimensional surface scan of at least a portion of the user, or a two-dimensional surface scan of at least the portion of the user.

7. The method of claim 1, wherein the user device utilizes one of a hash algorithm or a fuzzy hash algorithm to hash the at least a portion of the biometric data.

8. The method of claim 1, wherein the user device utilizes one of a SHA-256 algorithm, a Merkle-Damgard algorithm, a MD5 algorithm, a SHA-1 algorithm, a SHA-2 algorithm, a RACE Integrity Primitives Evaluation Message Digest-160 (RIPEMD-160) algorithm, a Whirlpool algorithm, or a BLAKE2 algorithm to hash the at least a portion of the biometric data.

9. The method of claim 1, wherein the additional identifying information comprises at least one of location information, temperature information, humidity information, date information, time information, elevation information, range information, or personal information.

10. The method of claim 1, wherein the biometric digital signature is a private identity key for the user.

11. The method of claim 1, wherein the user device is one of a smart phone, a tablet device, a personal computer, a laptop computer, a smart watch, a smart television (TV), a car, or a computing device.

12. The method of claim 1, wherein the user device comprises at least one of the at least one sensor, the sensor device, or the verification node.

13. A method for identity verification of at least one user, the method comprising:
   sensing, by at least one sensor, biometric information from a user;
   generating, by a sensor device, biometric data from the biometric information;
   transmitting, by the sensor device, the biometric data to a user device;
   hashing, by the user device, at least a portion of the biometric data to generate a biometric digital signature for the user;

storing, by the user device, at least a portion of the biometric digital signature for the user to a host biometric digital signature of user devices corresponding to each of at least n number of persons, such that a combination of the host biometric digital signatures for at least m number of the n number of persons comprises all of the biometric digital signature for the user, wherein the m number is a number greater than half of the n number;

obtaining, by the user device, the host biometric digital signatures from the user devices corresponding to the at least m number of persons;

reconstructing, by the user device, a biometric digital signature for the user by using the host biometric digital signatures obtained from the at least m number of persons;

transmitting, by the user device, the reconstructed biometric digital signature to a verification node; and receiving, by the user device from the verification node, a confirmation verification signal indicating that the user is verified by comparing the reconstructed biometric digital signature to a previous biometric digital signature for the user and determining the reconstructed biometric digital signature is identical to the previous biometric digital signature.

14. A system for identity verification of a user, the system comprising:

at least one sensor sensing biometric information from the user;

a sensor device generating biometric data from the biometric information and transmitting the biometric data to a user device;

the user device hashing at least a portion of the biometric data and at least a portion of additional identifying information to generate a biometric digital signature for the user, transmitting the biometric digital signature to a verification node, and storing at least a portion of the biometric digital signature for the user to a host biometric digital signature of user devices corresponding to each of at least n number of persons, such that a combination of the host biometric digital signatures for at least m number of the n number of persons comprises all of the biometric digital signature for the user, wherein the m number is a number greater than half of the n number; and the verification node obtaining host biometric digital signatures from other user devices corresponding to other users associated with the user, wherein each of the host biometric digital signatures comprises a portion of a previous biometric digital signature for the user, reconstructing the previous biometric digital signature from the portions of the host biometric digital signatures, comparing the biometric digital signature to the previous biometric digital signature for the user, and verifying the user when the verification node determines that the biometric digital signature is identical to the previous biometric digital signature for the user.

15. The system of claim 14, wherein when the user is verified, the verification node further generates and transmits to the user device, a confirmation verification signal indicating that the user is verified.

16. The system of claim 14, wherein the verification node does not verify the user when the verification node determines that the biometric digital signature is not identical to the previous biometric digital signature for the user.

17. The system of claim 14, wherein the user device comprises at least one of the at least one sensor, the sensor device, or the verification node.

18. The system of claim 14, wherein the user device utilizes one of a hash algorithm or a fuzzy hash algorithm to hash the at least a portion of the biometric data to generate the biometric digital signature for the user.

19. The system of claim 14, wherein the user device utilizes one of a SHA-256 algorithm, a Merkle-Damgard algorithm, a MD5 algorithm, a SHA-1 algorithm, a SHA-2 algorithm, a RACE Integrity Primitives Evaluation Message Digest-160 (RIPEMD-160) algorithm, a Whirlpool algorithm, or a BLAKE2 algorithm to hash the at least a portion of the biometric data.

20. The system of claim 14, wherein the additional identifying information comprises at least one of location information, temperature information, humidity information, date information, time information, elevation information, range information, or personal information.

* * * * *